(12) United States Patent
Gentry et al.

(10) Patent No.: US 8,209,531 B2
(45) Date of Patent: *Jun. 26, 2012

(54) REVOCATION OF CRYPTOGRAPHIC DIGITAL CERTIFICATES

(75) Inventors: Craig B. Gentry, Mountain View, CA (US); Zulfikar Amin Ramzan, San Mateo, CA (US); Bernhard Bruhn, Stuttgart (DE)

(73) Assignee: NTT DoCoMo, Inc., Tokyo (JP)

(*) Notice: Subject to any disclaimer, the term of this patent is extended or adjusted under 35 U.S.C. 154(b) by 183 days.

This patent is subject to a terminal disclaimer.

(21) Appl. No.: 12/492,896

(22) Filed: Jun. 26, 2009

(65) Prior Publication Data

US 2009/0265548 A1    Oct. 22, 2009

Related U.S. Application Data

(62) Division of application No. 11/218,093, filed on Aug. 31, 2005, now Pat. No. 7,814,314.

(60) Provisional application No. 60/606,213, filed on Aug. 31, 2004.

(51) Int. Cl.
*H04L 29/06* (2006.01)
*G06F 21/00* (2006.01)

(52) U.S. Cl. ........................ 713/158; 713/175

(58) Field of Classification Search .......... 713/156–158, 713/175

See application file for complete search history.

(56) References Cited

U.S. PATENT DOCUMENTS

| | | |
|---|---|---|
| 5,666,416 A | 9/1997 | Micali |
| 5,687,235 A | 11/1997 | Perlman |
| 5,699,431 A | 12/1997 | Van Oorschot |
| 5,717,757 A | 2/1998 | Micali |
| 5,717,758 A | 2/1998 | Micall |
| 5,793,868 A | 8/1998 | Micali |
| 5,903,651 A | 5/1999 | Kocher |
| 5,960,083 A | 9/1999 | Micali |
| 6,044,462 A | 3/2000 | Zubeldia |
| 6,097,811 A | 8/2000 | Micali |
| 6,128,740 A | 10/2000 | Curry |
| 6,141,347 A | 10/2000 | Shaughnessy et al. |
| 6,226,743 B1 | 5/2001 | Naor et al. |
| 6,292,893 B1 | 9/2001 | Micali |
| 6,301,659 B1 | 10/2001 | Micali |
| 6,381,695 B2 | 4/2002 | Kudo et al. |
| 6,381,696 B1 | 4/2002 | Doyle |
| 6,385,608 B1 | 5/2002 | Mitsuishi et al. |

(Continued)

FOREIGN PATENT DOCUMENTS

EP    0 932 109 A2    7/1999

(Continued)

OTHER PUBLICATIONS

Kaya et al. "Secure Multicast Groups on Ad Hoc Networks", ACM, 2003.*

(Continued)

*Primary Examiner* — Gilberto Barron, Jr.
*Assistant Examiner* — Virginia T Ho
(74) *Attorney, Agent, or Firm* — Michael Shenker; Haynes and Boone, LLP

(57) ABSTRACT

A single validity proof ($c_i(F)$) may be provided to certificate owners for a set (F) of the certificates via a multicast transmission if a multicasting group (2010) is formed to correspond to the set.

28 Claims, 13 Drawing Sheets

U.S. PATENT DOCUMENTS

| | | | |
|---|---|---|---|
| 6,397,329 B1 | 5/2002 | Aiello et al. |
| 6,442,689 B1 | 8/2002 | Kocher |
| 6,487,658 B1 | 11/2002 | Micali |
| 6,532,540 B1 | 3/2003 | Kocher |
| 6,766,450 B2 | 7/2004 | Micali |
| 7,260,572 B2 | 8/2007 | Min et al. |
| 2001/0034833 A1 | 10/2001 | Yagasaki et al. |
| 2002/0046337 A1 | 4/2002 | Micali |
| 2002/0165824 A1 | 11/2002 | Micali |
| 2002/0184504 A1 | 12/2002 | Hughes |
| 2003/0217265 A1 | 11/2003 | Nakano et al. |
| 2003/0221101 A1 | 11/2003 | Micali |
| 2003/0236976 A1 | 12/2003 | Wheeler |
| 2004/0049675 A1 | 3/2004 | Micali |
| 2004/0128504 A1 | 7/2004 | Kivinen |
| 2004/0148505 A1 | 7/2004 | Qiu |
| 2005/0053045 A1 | 3/2005 | Chmora |
| 2005/0055548 A1 | 3/2005 | Micali |
| 2005/0081037 A1 | 4/2005 | Kumagai |
| 2005/0278534 A1 | 12/2005 | Nadalin et al. |
| 2006/0129803 A1 | 6/2006 | Gentry |

FOREIGN PATENT DOCUMENTS

| | | |
|---|---|---|
| JP | 11-289329 | 10/1999 |
| JP | 2001-265216 | 9/2001 |
| JP | 2008-524931 | 7/2008 |
| WO | 97/16905 A1 | 5/1997 |
| WO | 2004/021638 | 3/2004 |
| WO | 2005/029445 | 3/2005 |
| WO | WO2005/002944 | 3/2005 |
| WO | 2006/066143 | 6/2006 |

OTHER PUBLICATIONS

M. Naor and K. Nissim. "Certificate Revocation and Certificate Update," IEEE Journal on Selected Areas in Communications, Apr. 2000.*

Office Action dated Oct. 7, 2010 in U.S. Appl. No. 12/492,901, 19 pages.

Office Action dated Sep. 7, 2010 in U.S. Appl. No. 12/492,898, 16 pages.

Office Action dated Sep. 3, 2010 in U.S. Appl. No. 12/840,437, 14 pages.

W. Aiello, S. Lodha, and R. Ostrovsky. Fast digital identity revocation. In *Proc. of CRYPTO '98*, 1998.

G. Ateniese, J. Camenisch, M. Joye, and G. Tsudik. A Practical and Provably Secure Coalition-Resistant Group Signature Scheme. In *Proceedings of CRYPTO 2000*, 2000.

M. Bellare and P. Rogaway. Random oracles are practical: A paradigm for designing efficient protocols. In *Proc. First Annual Conference on Computer and Communications Security*, ACM, 1993.

D. Boneh, B. Lynn, and H. Shacham. Short signatures from the Weil pairing. In *Proceedings of Asiacrypt '01*, 2001.

F. Elwailly and Z. Ramzan. QuasiModo: More Efficient Hash Tree-Based Certificate Revocation. Manuscript, 2003.

I. Gassko, P. S. Gemmell, and P. MacKenzie. Efficient and fresh certification. In Proceedings of PKC 2000, 2000.

S. Goldwasser, S. Micali, and R. L. Rivest. A Digital Signature Scheme Secure Against Adaptive Chosen-Message Attacks. SIAM Journal on Computing, 17(2):281-308, 1988.

Y-C. Hu, A. Perrig, and D. Johnson. Efficient security mechanisms for routing protocols. In proceedings of the 10th Annual Network and Distributed System Security Symposium (NDSS), 2003.

M. Jakobsson, J-P.Hubaux, and L. Buttyan. A micropayment scheme encouraging collaboration in multi-hop cellular networks. In *Proceedings of the 7th International Conference on Financial Cryptography*, 2003.

M. Jakobsson, T. Leighton, S. Micali, and M. Szydlo. Fractal merkle tree representation and traversal. In *Proceedings of the Cryptographer's Track*, RSA Conference, 2003.

S. Jarecki and A. Odlyzko. An efficient micropayment system based on probabilistic polling. In *Proceedings of the 1st International Conference on Financial Cryptography*, 1997.

Robert Johnson, David Molnar, Dawn Xiaodong Song, and David Wagner. Homomorphic signature schemes. In CT-RSA, pp. 244-262, 2002.

C. Jutla and M. Yung. PayTree: Amortized signatures for flexible micropayments. In *Proceedings of the second USENIX workshop on electronic commerce*, 1996.

S. Kim and H. Oh. An atomic micropayment system for a mobile computing environment. *IEICE Transactions of Information and Systems*, E84-D(6):709-716, 2001.

P. Kocher. On Certificate Revocation and Validation. In *Proceedings of the 2nd International Conference on Financial Cryptography*, 1998.

S. Micali. Efficient Certificate Revocation. MIT/LCS/TM 542b, Massachusetts Institute of Technology, 1996.

R. J. Lipton and R. Ostrovsky. Micro-Payments via Efficient Coin Flipping. In *Proceedings of the 2nd International Conference on Financial Cryptography*, 1998.

A. Malpani, R. Housely, and T. Freeman. Simple Certificate Validation Protocol—(SCVP). In *IETF Draft—draft-ietf-pkix-scvp-12.txt*, Jun. 2003.

S. Micali. Efficient Certificate Revocation. In *Proceedings of the RSA Data Security Conference*, 1997. Also U.S. Patent No. 5,666,416.

R. Steinfeld, L. Bull, Y. Zheng "Content Extraction Signatures" Lecture Notes in Computer Science, vol. 2288/2002, Springer Berlin / Heidelberg, Apr. 28, 2003.

S. Micali. NOVOMODO: scalable certificate validation and simplified PKI management. In *Proceedings of the 1st Annual PKI Research Workshop*, 2002.

M. Myers, R. Ankney, A. Malpani, S. Galperin, and C. Adams. X.509 internet public key infrastructure Online Certificate Status Protocol—OCSP. In *Internet RFC 2560*, Jun. 1999.

M. Naor and K. Nissim. Certificate Revocation and Certificate Update. In *Proceedings of USENIX Security*, 1998.

National Bureau of Standards. NBS FIPS PUB 81: DES modes of operation. 1980.

National Institute of Standards. FIPS 180-1: Secure hash standard. 1995.

M. Pierce and D. O'Mahony. Micropayments for Mobile Networks. In *Proceedings of European Wireless*, 1999. Winner of Best Paper Award.

R.L. Rivest. The MD5 message digest algorithm. In *Internet RFC 1321*, Apr. 1992.

R.L. Rivest. Electronic Lottery Tickets as Micropayments. In *Proceedings of the 2nd International Conference on Financial Cryptography*, 1997.

R.L. Rivest and A. Shamir. PayWord and MicroMint—Two Simple Micropayment Schemes. *CryptoBytes (RSA Laboratories)*, 2(1), 1996. Proceedings of 1996 International Workshop on Security Protocols.

R.L. Rivest, A. Shamir, and L. Adleman. A Method for Obtaining Digital Signatures and Public-Key Cryptosystems. *Communications of the ACM*, 21:120-126, 1978.

Ron Steinfeld, Laurence Bull, and Yuliang Zheng. Content extraction signatures. In *Proceedings of the 4th International Conference Seoul on Information Security and Cryptology*, pp. 285-304. Springer-Verlag, 2002.

H. Tewari and D. O'Mahony. Multiparty Micropayments for Ad-Hoc Networks. In *Proceedings of the IEEE Wireless Communications and Networking Conference (WCNC)*, 2003.

H. Tewari and D. O'Mahony. Real-Time Payments for Mobile IP. *IEEE Communications*, 41(2):126-136, 2003.

J. Zhou and K-Y. Lam. Undeniable Billing in Mobile Communication. In *Proceedings of MOBICOM*, 1998.

D. Wheeler. Transactions Using Bets. In *Proceedings of Fourth Cambridge Workshop on Security Protocols*, 1996.

Satoshi Koga and Kouichi Sakurai. A distributed certificate status protocol with single public key. In *Proceedings of PKC 2004*, pp. 389-401, 2004.

R. C. Merkle. Protocols for Public-Key Cryptography. In *IEEE Symposium on Security and Privacy*, 1980.

Machine translation into English of Japanese Patent Application No. 2001-265216, 13 pages.

Office Action dated Mar. 24, 2011 in JP Patent Application No. 2007-530381, 7 pages.
English Translation of Office Action dated Mar. 24, 2011 in JP Patent Application No. 2007-530381, 10 pages.
English Language Abstract of JP Pat App No. 2001-265216, 1 page.
Extended European Search Report for EP 07 11 3459.7, dated Jul. 5, 2011, 10 pages.
Erdem, O. M. "Efficient Self-Organized Key Management for Mobile Ad Hoc Network," Global Telecommunications Conference, 2004. Globecom '04, IEEE Dallas, TX, USA Nov. 29-Dec. 3, 2004, Piscataway, NJ, USA, IEEE, Piscataway, NJ, USA, vol. 4, Nov. 29, 2004, pp. 2185-2190.
Final Office Action dated Jan. 31, 2011, in related U.S. Appl. No. 12/840,437.
Final Office Action dated Feb. 11, 2011, in related U.S. Appl. No. 12/492,898.
Final Office Action dated Mar. 8, 2011, in related U.S. Appl. No. 12/492,901.
Office Action dated Jun. 17, 2011, in related U.S. Appl. No. 12/492,908.
Extended European Search Report dated Jul. 5, 2011, in related European Appl. No. EP 07113462.1.
Elwailly et al., "QuasiModo: Efficient Certificate Validation and Revocation" Feb. 26, 2004, Public Key Cryptography 2004, Springer-Verlag, Berlin/Heidelberg, XP019002849, pp. 375-388.
Extended European Search Report for EP 05 79 3243.6, dated Jul. 5, 2011, 8 pages.
Kikuchi et al., "Performance Evaluation of Public-Key Certificate Revocation System with Balanced Hash Tree" Parallel Processing, 1999. Proceedings. 1999 International Workshops on Aizu-Wakamatsu, Japan Sep. 21-24, 1999, Los Alamitos, CA, USA, IEEE, US, Sep. 21, 1999, pp. 204-209.
Johnson R. et al. "Homomorphic Signature Schemes" Topics in Cryptology: The Cryptographer's Track at the RSA Conference 2002, San Jose, CA USA, Feb. 18-22, 2002, Springer, Berlin Heidelburg, vol. 2271 Feb. 18, 2002, pp. 244-262.
Extended European Search Report for EP 07 11 3458.9, dated Jul. 5, 2011, 9 pages.
Extended European Search Report for EP 07 11 3461.3, dated Jul. 5, 2011, 8 pages.
Non-Final Office Action dated Oct. 19, 2011 in U.S. Appl. No. 12/492,908, 13 pages.
Examiner's Answer dated Oct. 27, 2011 in U.S. Appl. No. 12/840,437, 10 pages.
S. Berkovits, et al., "A Comparison of Certificate Validation Methods for Use in a Web Environment", MITRE Technical Report, Nov. 1998, 43 pages.

* cited by examiner

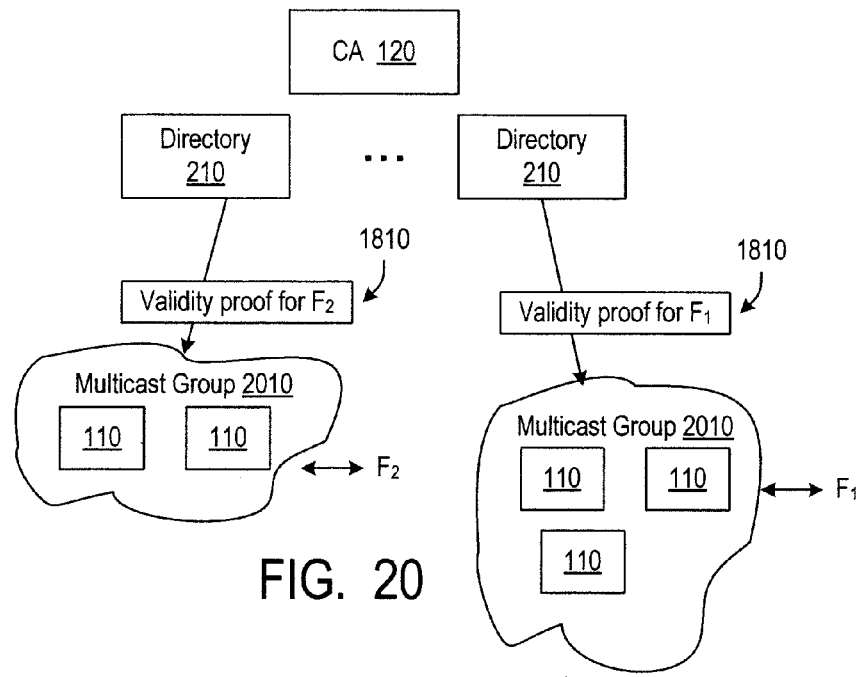
FIG. 20
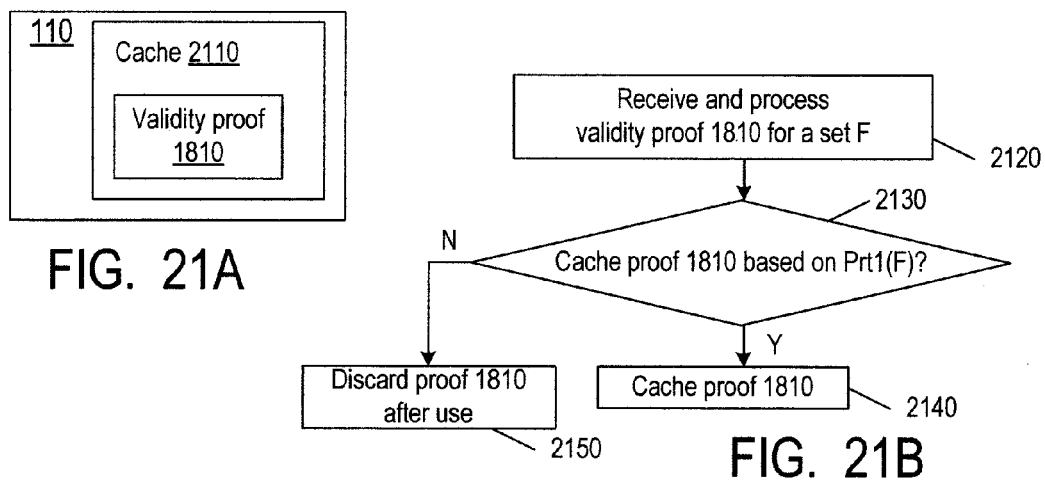
FIG. 21A
FIG. 21B
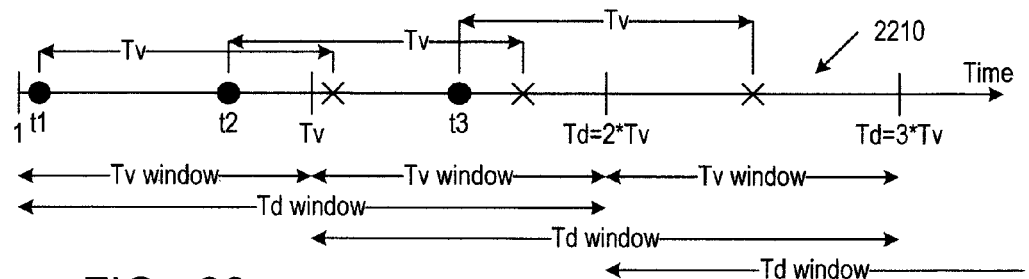
FIG. 22

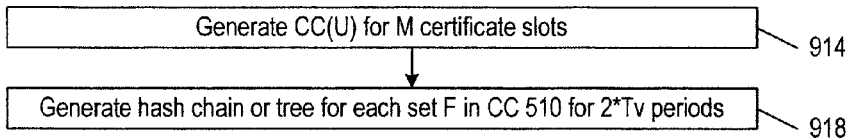
FIG. 23A
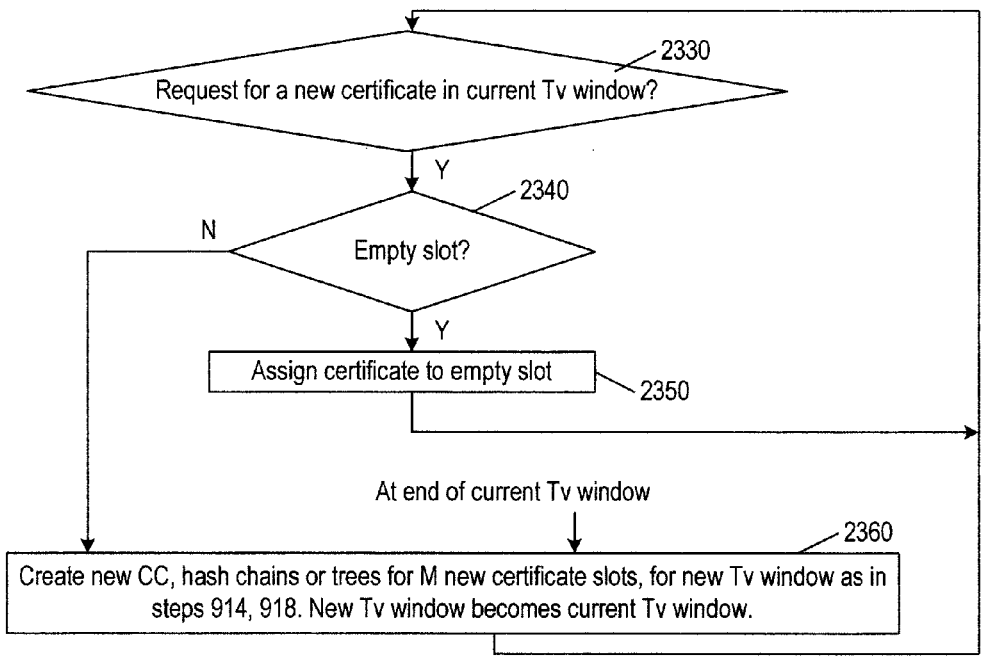
FIG. 23B
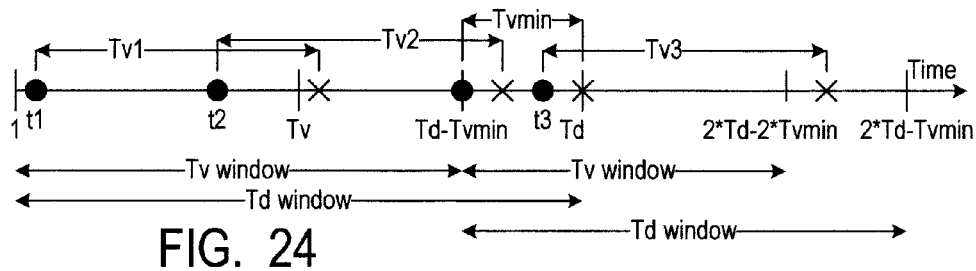
FIG. 24
FIG. 25

US 8,209,531 B2

REVOCATION OF CRYPTOGRAPHIC DIGITAL CERTIFICATES

CROSS REFERENCE TO RELATED APPLICATIONS

The present application is a divisional of U.S. patent application Ser. No. 11/218,093, filed Aug. 31, 2005 now U.S. Pat. No. 7,814,314, which claims priority of U.S. Provisional Application No. 60/606,213 filed on Aug. 31, 2004, both of which are incorporated herein by reference.

BACKGROUND OF THE INVENTION

The present invention relates to public key cryptography, and more particularly to digital certificate revocation.

Digital certificates 104 (FIG. 1) are used in public key infrastructures (PKI) to facilitate secure use and management of public keys in a networked computer environment. Users U1, U2, ... utilize their computer systems 110.1, 110.2, ... to generate respective key pairs (PK, SK) where PK is the public key and SK is the secret key. FIG. 1 shows a key pair ($PK_{U1}$, $SK_{U1}$) for user U1. The users register their public keys PK, over a network, with a certification authority (CA) 120. Alternatively, the key pairs can be generated by CA 120 and sent to the users. CA 120 is a secure, trusted computer system. For each public key PK, CA 120 generates a digital certificate 104. Certificate 104 contains the public key PK and the user's name and may also contain the user's email address or addresses, the certificate's serial number SN (generated by the CA to simplify the certificate management), the certificate issue date D1, the expiration date D2, an identification of algorithms to be used with the public and secret keys, an identification of the CA 120, and possibly other data. The data mentioned above is shown at 104D. Certificate 104 also contains CA's signature 104-$Sig_{CA}$ on the data 104D. The signature is generated using CA's secret key $SK_{CA}$. CA 120 sends the certificate 104 to the user's (key owner's) computer system 110. Either the owner or the CA 120 can distribute the certificate to other parties to inform them of the user's public key PK. Such parties can verify the CA's signature 104-$Sig_{CA}$ with the CA's public key $PK_{CA}$ to ascertain that the certificate's public key PK does indeed belong to the person whose name and email address are provided in the certificate.

A certificate may have to be revoked prior to its expiration date D2. For example, the certificate owner U may change his affiliation or position, or the owner's private key $SK_U$ may be compromised. Other parties must be prevented from using the owner's public key if the certificate is revoked.

One approach to prevent the use of public keys of revoked certificates is through a certificate revocation list (CRL). A CRL is a signed and time-stamped list issued by CA 120 and specifying the revoked certificates by their serial numbers SN. These CRLs must be distributed periodically even if there are no new revoked certificates in order to prevent any type of replay attack. The CRL management may be unwieldy with respect to communication, search, and verification costs. Certificate revocation trees (CRTs) can be used instead of CRLs as described in [15] (the bracketed numbers indicate references listed at the end before the claims).

Instead of CRLs and CRTs, CA 120 could answer queries about specific certificates. In FIG. 1, user U2 issues a query 150 with the serial number SN of certificate 104 of user U1. CA 120 responds with a validity status information 160 containing the serial number SN, a validity status field 160VS ("valid", "revoked" or "unknown"), and a time stamp "Time". The response is signed by CA (field 160-$Sig_{CA}$). This approach is used for Online Certificate Status Protocol (OCSP). See [23]. Disadvantageously, the CA's digital signature 160-$Sig_{CA}$ can be quite long (over 1024 bits with RSA), especially since the CA must be very secure. In addition, if CA 120 is centralized, the CA becomes a validation bottleneck. If CA 120 is decentralized (replicated), the security is weakened as the CA's signing key $SK_{CA}$ is replicated.

FIG. 2 illustrates a "NOVOMODO" approach, which allows CA 120 to provide an unsigned validity status through untrusted directories 210 at pre-specified time intervals (e.g. every day, or every hour, etc.). Directories 210 are computer systems that do not store secret information. The system works as follows.

Let f be a predefined public length-preserving function $$f: \{0,1\}^n \to \{0,1\}^n$$

where $\{0,1\}^n$ is the set of all binary strings of a length n. Let $f^i$ denote the f-fold composition; that is, $f^i(x)=x$ for i=0, and $f^i(x)=f(f^{i-1}(x))$ for i>0. Let f be one-way, i.e. given f(x) where x is randomly chosen, it is hard (infeasible) to find a pre-image z such that f(z)=f(x), except with negligible probability. "Infeasible" means that given a security parameter k (e.g. k=n), the pre-image z cannot be computed in a time equal to a predefined polynomial in k except with negligible probability. Let us assume moreover that f is one-way on its iterates, i.e. for any i, given $y=f^i(x)$, it is infeasible to find z such that f(z)=y.

We can assume, without loss of generality, that CA is required to provide a fresh validity status every day, and the certificates are valid for one year, i.e. 365 days (D2−D1=365 days). To create a certificate 104 (FIG. 2), CA 120 picks a random "seed" number x and generates a "hash chain" $c_0$, $c_1$, ... $c_{365}$ wherein:

$$c_{365}=f(x), c_{364}=f(f(x)), \ldots c_1=f^{365}(x), c_0=f^{366}(x). \quad (1)$$

We will sometimes denote x as x(SN) for a certificate with a serial number SN, and similarly $c_i=c_i(SN)$ where i=0, 1, .... The value $c_0$ is called a "validation target". CA 120 inserts $c_0$ into the certificate 104 together with data 104D (FIG. 1). CA 120 also generates a random revocation seed number $N_0$, computes the "revocation target" $N_1=f(N_0)$, and inserts $N_1$ into certificate 104. CA 120 keeps all $c_i$ secret for i>0. The values x and $N_0$ are also secret. Clearly, all $c_i$ can all be computed from x, and the validation target $c_0$ can be computed from any $c_i$. CA 120 stores in its private storage the values x and $N_0$ for each certificate 104, and possibly (but not necessarily) caches the $c_i$ values.

Every day i (i=1, 2, ... 365), for each certificate 104, CA distributes to directories 210 a validity proof data structure which includes, in addition to a validity status indication (not shown in FIG. 2, can be "valid" or "revoked"):

1. the certificate's "i-token" $c_i$ if the certificate is valid on day i;
2. the revocation seed $N_0$ if the certificate has been revoked.

This information is distributed unsigned. Each directory 210 provides this information, unsigned, to a requester system 110 in response to a validity status request 150 (FIG. 1). To verify, the requester (verifier) 110 performs the following operations:

1. If the validity status is "valid", the verifier 110 checks that $f^i(c_i)=c_0$.
2. If the validity status is "revoked", the verifier 110 checks that $f(N_0)=N_1$.

Despite the validity information being unsigned, the scheme is secure because given $c_i$, it is infeasible to compute the subsequent tokens $c_{i+1}, c_{i+2}, \ldots$.

To reduce the communication between CA 120 and directories 210, a hash chain (1) can be generated for a set of certificates 104, and a single i-token $c_i$ can be distributed for the set if the set is "unrevoked" (i.e. all the certificates are unrevoked in the set). FIG. 3 illustrates certificate sets $F_1$ through $F_4$. $F_1$ is the set of all the certificates 104; $F_2 \subset F_3 \subset F_1$ and $F_4 \subset F_1$. In addition to the seed numbers x, $N_0$ for each certificate 104, CA 120 generates random seed numbers $x(F_i)$, $N_0(F_i)$ for each set $F_i$ and constructs a hash chain (1) from each number $x(F_i)$, with a validation target $c_0(F_i) = f^{366}(x(F_i))$. Each certificate 104 is augmented with the targets $c_0(F_i)$ for each set $F_i$ containing the certificate.

Every day i, if all the certificates are valid, CA 120 distributes to directories 210 only the i-token $c_i(F_1)$. If only the set $F_3$ has invalid certificates, CA 120 distributes the i-tokens for the set $F_4$ and for all the valid certificates in the set $F_2$. If only the set $F_2$-$F_3$ has invalid certificates, CA 120 distributes the i-tokens for the sets $F_3$ and $F_4$ and for all the valid certificates in $F_2$-$F_3$, and so on.

In response to a validity status request for a certificate 104, a directory 120 sends to the requester (the verifier):

1. an i-token $c_i$ for the certificate or for a set $F_i$ containing the certificate if the certificate is valid;
2. the certificate's revocation number $N_0$ if the certificate has been revoked.

If the response indicates that the certificate is valid, the verifier checks that $f^i(c_i)$ is equal to one of the certificate's validation targets. If the response indicates that the certificate is revoked, the verifier checks that $f(N_0) = N_1$ for the certificate.

Clearly, for each set R of revoked certificates (FIG. 4), it is desirable to find a minimum set of sets $F_i$ covering the valid certificates R'. By definition herein, the sets $\{F_i\}$ "cover" R' if the union $U F_i = R'$. We will say that $\{F_i\}$ is the "complement cover" of R. The complement cover of R will be denoted as $CC_R$.

Also, it is desirable to find a system of sets $\{F\}$ containing a small complement cover for any set R or at least for many possible sets R. If $\{F\}$ contains a cover for each set R of the certificates, we will call $\{F\}$ a complement cover for the set of all the certificates, and will denote this complement cover CC(U) or just CC.

For uniformity, we will assume that each certificate 104 corresponds to a singleton set consisting of that certificate. The hash chain for the singleton set is the same as for the certificate.

Clearly, if $\{F\}$ contains the singleton set for each certificate, then $\{F\}$ is a complement cover for the set of all the certificates.

Complement covers can be constructed using trees. FIG. 5 illustrates a binary tree 510 for eight certificates, numbered 1 through 8. Each node represents a set $F_i$. Each leaf node (labeled 1, 2, . . . ) represents a singleton set for a respective certificate 1, 2, . . . . Each higher level node represents the union of its children. E.g., node 1-4 represents the set of certificates 1 through 4. The root represents all the certificates. (We will use the numeral 510 to represent both the tree and the complement cover.)

If a certificate is revoked, then the corresponding leaf is revoked, i.e. represents a set that cannot be used for the i-token distribution. Also, each node in the path from the leaf to the root is revoked. In the example of FIG. 6, the certificates 3 and 8 are revoked (as indicated by "x" marks). The sets 3-4, 1-4, 1-8, 7-8, 5-8 are therefore revoked. The minimal complement cover $CC_R$ of the revoked certificates consists of nodes 1-2, 4, 5-6, 7. Generally, the minimal complement cover $CC_R$ consists of all the nodes that are children of the revoked nodes.

Computer tree traversal algorithms are known that can be implemented on CA 120 to mark revoked nodes when a certificate is revoked, and to find all the immediate unrevoked children of the revoked nodes. Each day CA 120 distributes the i-tokens for the immediate children and the $N_0$ tokens for the revoked leafs.

SUMMARY

This section summarizes some features of the invention. Other features are described in the subsequent sections. The invention is defined by the appended claims which are incorporated into this section by reference.

One aspect of the present invention is directed to reducing the certificate size. A certificate 104 in FIG. 3 may include multiple targets $c_0$. In some embodiments, a method is used to map such targets into a single "super-target". The certificate includes the super-target but not the multiple targets.

Another aspect of the invention is directed to redacting the certificate by deleting unnecessary targets. In FIG. 3, each certificate 104 includes multiple targets $c_0$ plus a revocation target $N_1$. The verifier needs just one of these targets for the validity or invalidity proof. The verifier may get the certificate and the proof from another party. It is desirable for the other party to redact the certificate by deleting the unnecessary targets, but the other party may be unable to generate the CA's signature 104-$Sig_{CA}$ on the redacted certificate. In some embodiments of the present invention, the CA uses a redactable signature to enable other parties to delete the unnecessary targets without the CA's signing key (secret key $SK_{CA}$). The other parties are still able to prove the CA's signature to the verifier.

Another aspect of the invention is directed to efficient distribution of certificate validity proofs. In some embodiments, the validity proofs (e.g. i-tokens) are distributed to the certificate owners. If a system 110 issues a request 150 for a validity proof, the validity proof is provided by the owner rather than the CA or a directory. A validity proof (e.g. an i-token) for a set F comprising multiple certificates can be distributed to the certificates' owners via a multicast transmission if the corresponding computer systems 110 form a multicasting group. In some embodiments the sets F and the multicasting groups are matched to facilitate the multicast transmissions. E.g., a multicasting group can be created for a set F, or a set F can be created by the CA in the setup phase for a multicasting group. Also, a complement cover $CC_R$ can be chosen to maximize the number of sets F for which the multicasting groups exist.

Another aspect of the invention is directed to efficient caching of validity proofs. In some embodiments, if a system 110 (e.g. 110.1) gets a validity proof for a certificate, the system 110.1 may cache the validity proof. Another system 110.2 may get the validity proof from the system 110.1 rather than the CA or a directory. In some embodiments, the certificate sets F are assigned caching priorities which are taken into account by the system 110.1 when making a decision as to whether or not to cache a validity proof for a set F. The caching priorities may be based on the number of certificates in the set F, and/or the sum of the remaining unexpired validity periods for the certificates in F, and/or other factors.

Another aspect of the invention is directed to generation of certificate validation data structures (such as the hash chain seeds x) by the CA. For a hash chain (1), for example, the data structures are generated for a predefined number of periods of time (e.g. 365 days), with each i-token corresponding to the period i. The number of periods of time is defined by the certificate's maximum validity period as defined by the certificate's issue and expiration dates D1 and D2. The number of periods of time is incorporated into the target $c_0$. This complicates the addition of new certificates, especially if a complement cover is used since complement covers interrelate the validation proofs for multiple certificates. In some embodiments, in the setup phase, the CA generates the data structures for more periods of time than required by the certificates' maximum validity periods. For example, the CA can generate the data structures for some predefined number M of certificates for some number Td of periods of time where Td is greater than the maximum validity period. The actual number of the certificates created in the setup phase may be less than M. The CA can add new certificates after the setup phase as long as the new certificates will expire before or in the last time period Td. A validity proof may include the i-token $c_i(F)$ and, in addition, the number j of times needed to apply the function f to the i-token to obtain the target $c_0(F)$. The verifier checks that $f^j(c_i(F))=c_0(F)$. The hash chains can be replaced with other structures, e.g. hash trees as described below.

Another aspect of the invention is directed to providing a distributed certificate authority. The CA distributes validation data (e.g. i-tokens) to "Sub-CA" computer systems which in turn generate validation proofs and provide them to verifiers. The CA distributes secret data to the Sub-CAs in advance. For example, the CA can distribute all the i-tokens for all the certificates in the setup phase. Any one or more of a number of techniques are used to make the validation secure even if a Sub-CA is compromised.

One technique involves generating different data for the same certificate for different Sub-CAs. Thus, a separate validation seed x and a separate revocation seed $N_0$ can be generated for each certificate for each Sub-CA. The certificate may include all the respective validation and revocation targets. Alternatively, the validation targets may be mapped into a single "super-target" by a public function, and the certificate may have only the validation "super-target". The revocation targets can be handled in the same way. Alternatively, all the validation and revocation targets can be mapped into a single super-target.

Further, in each period i, a Sub-CA validity proof is made available by the CA for each Sub-CA for the period i. If a Sub-CA is compromised, the CA withholds the Sub-CA's validity proof. Therefore, the verifiers will know that the Sub-CA is invalid, and will not use the Sub-CA's certificate validity proofs. If the remaining Sub-CAs are not compromised, their data remain secret because each Sub-CA has its own certificate validation data as described above.

Further, a mechanism is provided for recovering control of a compromised Sub-CA. The mechanism involves encryption of the certificate validation data before transmitting the data to the Sub-CAs. For each period i, or a number of consecutive periods i (such consecutive periods i will be called a "partition"), separate encryption/decryption keys are used (the encryption can be symmetric or asymmetric). Further, different decryption keys are used for different Sub-CAs. For each partition, the decryption keys are provided to the Sub-CAs at or shortly before the start of the partition. If a Sub-CA is compromised in any partition, the adversary may get hold of the decrypted data (e.g. i-tokens) for the current partition, but the data for the future partitions are encrypted and thus secure. If the CA gets control of the Sub-CA again, the CA may reactivate the Sub-CA at or after the end of the last partition for which the Sub-CA received its decryption key. The CA does not provide the decryption keys to compromised Sub-CAs.

The invention is not limited to the features and advantages described above. Other features are described below. The invention is defined by the appended claims.

BRIEF DESCRIPTION OF THE DRAWINGS

FIG. 20 is a block diagram illustrating networked computer systems and data structures for certificate revocation schemes according to some embodiments of the present invention.

FIG. 21A is a block diagram illustrating of computer system with data according to some embodiments of the present invention.

FIG. 21B is a flowchart for certificate revocation schemes according to some embodiments of the present invention.

FIG. 22 is a timing diagram for certificate revocation schemes according to some embodiments of the present invention.

FIGS. 23A, 23B are flowcharts for certificate revocation schemes according to some embodiments of the present invention.

FIG. 24 is a timing diagram for certificate revocation schemes according to some embodiments of the present invention.

FIG. 25 is a flowchart for certificate revocation schemes according to some embodiments of the present invention.

DESCRIPTION OF SOME EMBODIMENTS

The embodiments described in this section illustrate but do not limit the invention. The invention is defined by the appended claims.

We will assume that the CA 120, the directories 210, the systems 110 are computer systems communicating with each other over a network or networks. Each of these systems may itself be a computer system having components communicating over networks. Each computer system includes one or more computer processors executing computer instructions and manipulating computer data as described above and below. The term "data" includes "computer data" and covers both computer instructions and computer data manipulated by the instructions. The instructions and data can be stored on a data carrier such as a computer storage, i.e. a computer readable medium (e.g. a magnetic or optical disk, a semiconductor memory, and other types of media, known or to be invented). The data carrier may include an electromagnetic carrier wave transmitted through space, via a cable, or by some other means. A "cache" can be any computer storage. The instructions and data are operable to cause the computer to execute appropriate algorithms as described above.

We will use the following notation. We let DS=(KG, Sign, Vf) denote a digital signature scheme. Here KG denotes a key generation algorithm, Sign(Sk, M) denotes the signing algorithm which outputs a signature σ on a message M under a signing key Sk. Vf(Pk, M, σ) denotes the verification algorithm which evaluates to a binary value indicating whether or not the signature σ on the message M is correct with respect to a public key Pk. We let $\{0,1\}^*$ denote the set of all bit strings. |s| denotes the length of a bit string s. We let H denote a cryptographic compression function that takes as input a b-bit payload and a v-bit initialization vector IV and produces a v-bit output. In some embodiments, $b \geq 2v$. We will assume that the cryptographic compression functions mentioned below can be collision resistant, i.e. it is difficult to find two distinct inputs $m_1 \neq m_2$ such that $H(IV, m_1) = H(IV, m_2)$. We will assume that IV is fixed and publicly known, and we will sometimes omit it for notational simplicity. Practical examples of such cryptographic compression functions are SHA-1[26] (output size is 20 bytes) and MD5 [28] (output size 16 bytes), both having a 64-byte payload. For simplicity, we will use the term "hash function" instead of compression function. The term "hash function" can also denote a mapping form $\{0,1\}^*$ into $\{0,1\}^v$ for some fixed v. Hash functions are typically one way and collision resistant, but the invention is not limited to such functions.

Hash Tree Over Targets.

Figure 3:
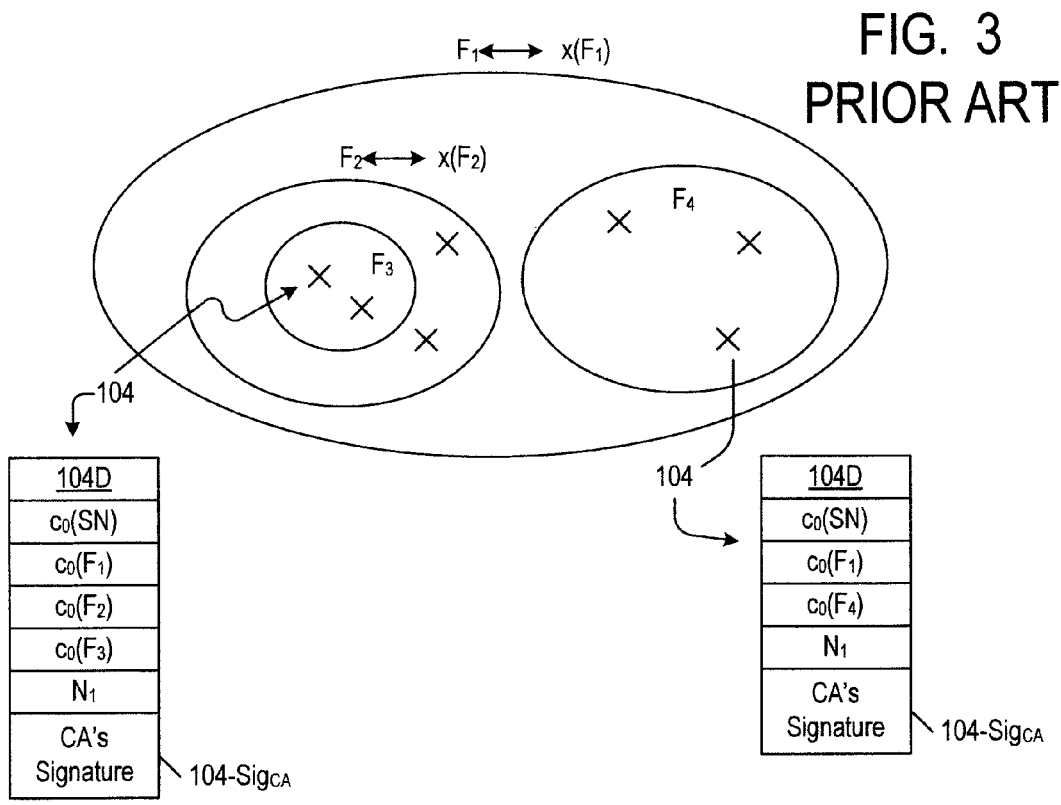
FIGS. 3, 4 illustrate sets of certificates for prior art certificate revocation schemes.

In order to reduce the size of a certificate 104 of FIG. 3, some algorithm A can be defined allowing the verifier to map each validation target to a common "super-target" value r:

$$r \leftarrow A(c_0) \text{ for all targets } c_0 \text{ for this certificate.} \quad (2)$$

Then the targets $c_0$ can be deleted from the certificate and replaced with the value r.

Figure 6:
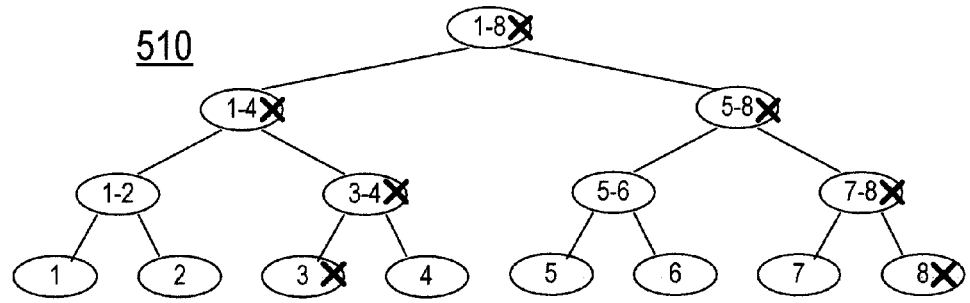
Figure 7A:
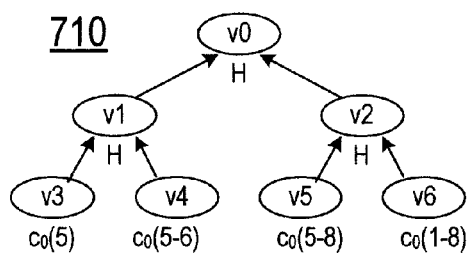
FIGS. 7A, 7B illustrate computer data structures for certificate revocation schemes according to some embodiments of the present invention.

In some embodiments, the algorithm A is defined using a hash tree data structure. A hash tree is a tree in which each node ("vertex") v is assigned a value Value(v). A hash tree is created for each certificate 104. FIG. 7A shows an example for the certificate revocation scheme of FIGS. 5-6 for the certificate no. 5. The tree nodes are numbered from top to bottom, left to right, breadth first. Thus, the root is labeled "v0", its children are "v1" and "v2", and so on. The labeling scheme is for illustration and is not limiting. The certificate no. 5 belongs to each of four sets F, namely, the sets {5}, {5, 6}, {5, 6, 7, 8}, {1, 2, 3, 4, 5, 6, 7, 8}. Let us denote the respective targets $c_0(5)$, $c_0(5\text{-}6)$, $c_0(5\text{-}8)$, $c_0(1\text{-}8)$. These targets' values are assigned to the tree leafs v3, v4, v5, v6, in any order:

Value(v3)=$c_0(5)$, Value(v4)=$c_0(5\text{-}6)$, and so on.

The values of the higher level nodes are computed using some public algorithm, for example:

$$\text{Value}(v) = H(\text{Value}(\text{left child of } v) \circ \text{Value}(\text{right child of } v)) \quad (3)$$

where v is any higher level node, H is a public hash function, and "o" denotes string concatenation. The certificate 104 (FIG. 7B) contains the root value Value(v0) but does not contain the targets $c_0$. In some embodiments, each target $c_0$ is the same size as Value(v0), e.g. 20 bytes. The certificate size is therefore reduced.

Figure 5:
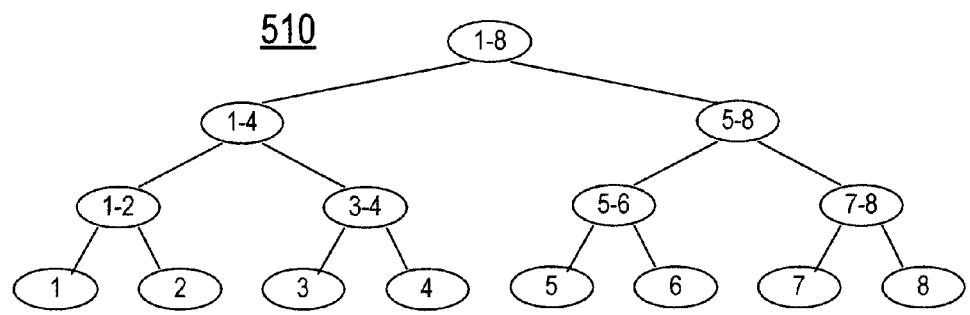
FIGS. 5, 6 illustrate computer data structures for prior art certificate revocation schemes.
Figure 8:
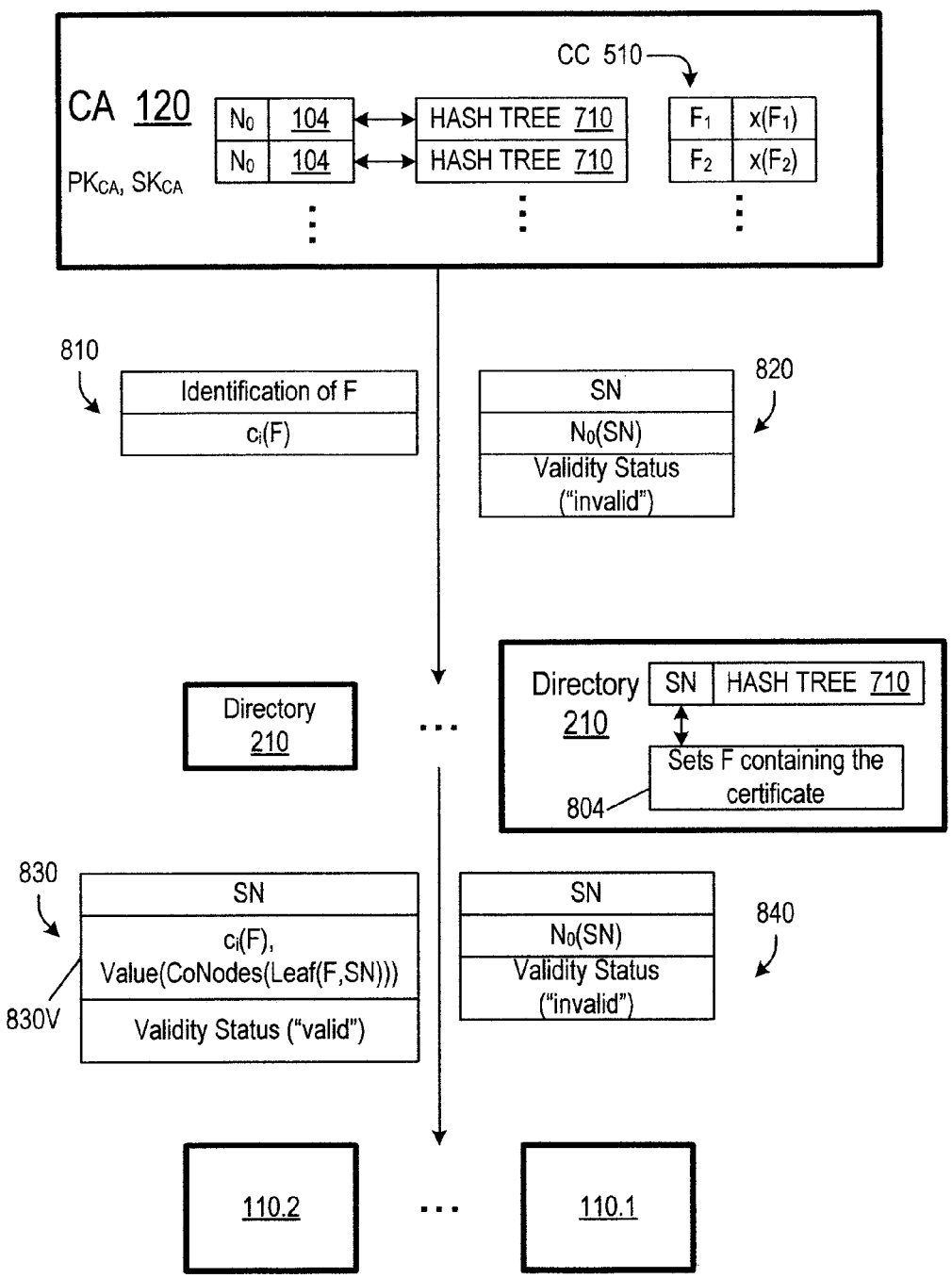
FIG. 8 is a block diagram illustrating networked computer systems and data structures for certificate revocation schemes according to some embodiments of the present invention.

FIG. 8 illustrates some data structures in CA 120 and directories 210. At the set up stage (shown in FIG. 9), CA 120 generates the revocation seed $N_0$ for each certificate 104 (step 910 in FIG. 9). CA 120 also generates the complement cover CC (step 914). We will assume that the complement cover is generated as in FIG. 5, but this is not necessary. The complement cover could be generated using any other method, known or to be invented. CA 120 also generates the validation seed x(F) for each set F in the complement cover 510 (step 918). These steps can be performed as in prior art (FIGS. 5-6). In addition, CA 120 generates a hash tree 710 for each certificate 104 (step 922). At step 930, CA 120 distributes to each directory 210 the information which will allow the directory to determine, for each certificate (each serial number SN), (i) all the sets F containing the certificate (as shown at 804 in FIG. 8), and (ii) the corresponding hash tree 710.

Figure 4:
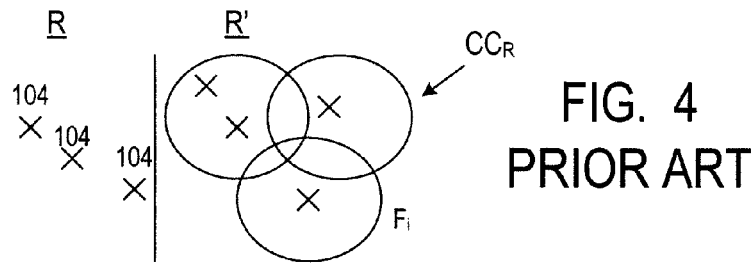

At the start of each period pi (we will use the expressions "period pi" and "period i" interchangeably), or shortly before the period pi, CA 120 determines a minimal complement cover $CC_R$ of the revoked certificates R (as in FIGS. 4-6 for example). CA 120 distributes to directories 210 a possibly unsigned data structure 810 (FIG. 8) for each set F in $CC_R$, and a possibly unsigned data structure 820 for each invalid certificate 104. These structures can be as in prior art FIGS. 5-6. Structure 810 contains an identification of the set F and the token $c_i(F)$. (We will refer to $c_i(F)$ as "period data" for the period $c_i$; "period data" are data from which a target is computable by the verifier). Structure 810 may also contain other information, such as an identification of the period pi and/or of function f. Structure 820 contains the certificate's serial number SN, the value $N_0$ for the certificate, and an indication that the certificate has been revoked.

In response to a request from a verifier system 110, a directory 210 responds with a possibly unsigned data structure 830 if the certificate is valid, and a possibly unsigned data structure 840 if the certificate is invalid. Even before issuing the request, the verifier can check the CA's signature on the certificate (step 1004 in FIG. 10) and the expiration date D2 to make sure the certificate has not expired. Receiving a directory response 830 or 840 is shown at 1006. Structure 830 specifies the validity status as "valid" and includes, in a field 830V, the i-token $c_i(F)$ and sufficient information to compute the root value r=Value(v0) of the certificate's hash tree 710. Note equation (2) above. If the response is structure 830 (as determined at step 1010), i.e. the certificate is claimed to be valid, the verifier computes the target $c_0(F)$ from $c_i(F)$ using the hash chain equations (1) at step 1020. At step 1030, the verifier computes the root value Value(v0) from the additional information in field 830V. In some embodiments (not shown in FIGS. 8, 10), this information includes the leaf values (such as c0(5), c0(5-6), c0(5-8), c0(1-8) in FIG. 7A). The verifier uses equation (3) to compute the root value. Actually, the verifier does not need all the leaf values. For example, suppose the complement cover is as in FIGS. 5, 7A, and F={5-6}. In order to compute Value(v0) from $c_0(5\text{-}6)$, the verifier only needs the values of nodes v3 and v2. The nodes v3 and v2 will be called co-nodes of v4 and denoted collectively as CoNodes (v4). More generally, the co-nodes are all the nodes needed to compute the root value. CoNodes(v) is defined as the set of all siblings of the nodes on the path from node v to the root. CoNodes(v) can be defined for binary and non-binary trees as follows:

CoNodes(v)=∅(empty set) if v is the root;

Sib(v)∪ CoNodes(Parent(v)) otherwise. (4)

Here Sib(v) is the (possibly empty) set of all siblings of v, and Parent(v) is the parent node of v.

In some embodiments, the structure 830 includes the co-nodes' values shown as Value(CoNodes(Leaf(F, SN))) in FIG. 8. Here Leaf(F, SN) is the leaf node corresponding to the set F in tree 710 of the certificate with the serial number SN. The expression Value(CoNodes(Leaf(F, SN))) denotes all the co-node information needed to compute the root value Value (v0) for the tree 710. The co-node information may include not only the co-node values but also the order in which the co-node values must be concatenated for equation (3). For example, for FIG. 7A, Value(CoNodes(v4)) can be represented as a list:

(L,v3);(R,v2) (5)

Here L and R are values of a one-bit flag indicating if the co-node must be on the left or the right in the concatenation. For example, in the expression Value(v1)=$H$(Value(v3)$o$ Value(v4)), Value(v3) is to the left of Value(v4), therefore the flag value for v3 is L.

Of note, the verifier does not need to know the geometry of tree 510 or 710 since the list (5) is sufficient to compute the root value Value(v0). The root value can be computed as follow:
Listing 1: Root Value Computation
1. Root value←starting value (i.e. Value(Leaf(F, SN)=$c_0$(F)).
2. Traverse the list Value(CoNodes(Leaf(F, SN))) (such as the list (5)) from left to right.
For each co-node,
    if the L or R flag value is L, then
    Root value←$H$(Value(co-node) o Root value)
    otherwise
    Root value←$H$(temp o Value(co-node))
End of Listing 1.

Figure 10:
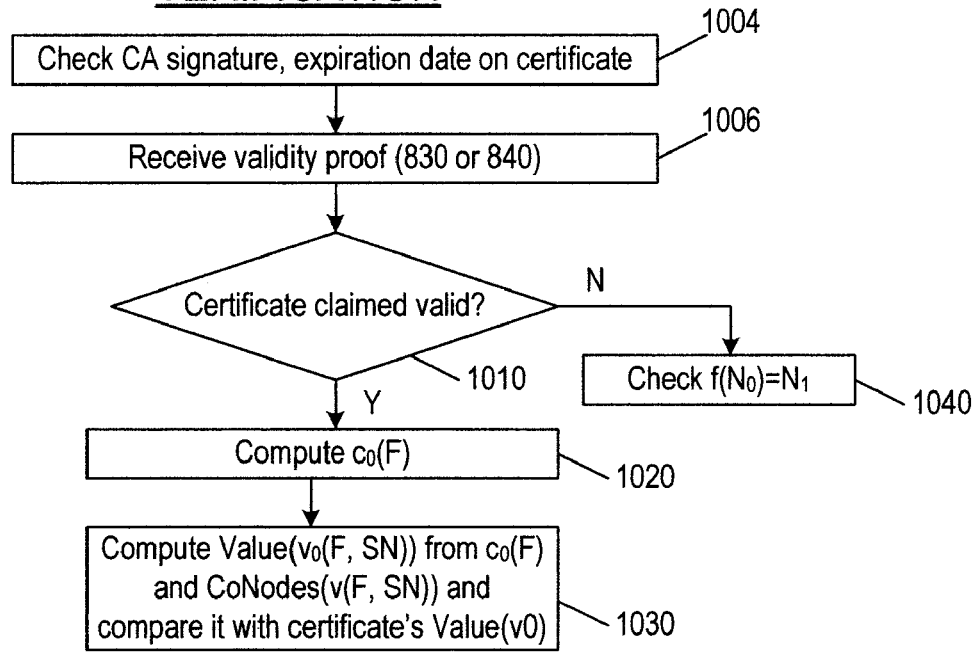

The verifier computes the root value at step 1030 (FIG. 10). The root value is shown as Value(v0(F, SN)) in FIG. 10. The verifier compares the computed root value with the certificate's Value(v0). If the two values are equal, the certificate is assumed valid. Otherwise, the validity proof fails (the certificate is assumed invalid or the verifier may request another proof).

The structure 840 for an invalid certificate can be as in prior art, and can have the same information as structure 820. The verifier checks at step 1040 that f($N_0$)=$N_1$, as in prior art.

Figure 11:
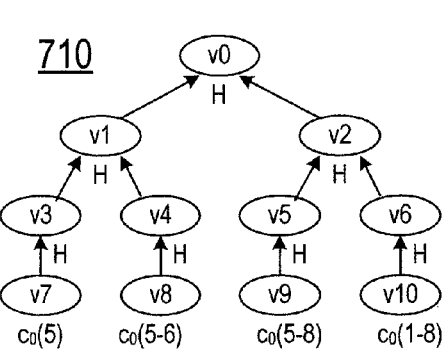
FIGS. 11-14 illustrate computer data structures for certificate revocation schemes according to some embodiments of the present invention.

The invention is not limited to the hash tree 710 of the form of FIG. 7A. For example, the leaf node values $c_0$ can be replaced with $H(c_0)$. This is similar to using a tree 710 of FIG. 11. Here an extra layer of nodes v7-v10 is added at the bottom to serve as leafs. Each leaf is a single child, with a value $c_0$(F) for a respective set F. Hence the values of nodes v3-v7 are $H(c_0)$ where $c_0$ for the corresponding $c_0$. If the function H is defined only on the set $\{0,1\}^{2k}$ where k is the length of each target $c_0$, then the $c_0$ values can be padded to the length 2k in any suitable manner to define $H(c_0)$. Other tree structures can also be used. The number of sets F containing each given certificate does not have to be a power of 2. For example, some leaf nodes can be dummy nodes, assigned some random or pseudo-random values. Also, non-binary trees or non-balanced trees can be used. A value $c_0$ can be assigned to a non-leaf node. Further, the value of a parent node need not be computed as in equation (3). For example, the children values can be concatenated with some additional values to compute the parent node's value, or the children values can be added or subjected to some other processing. Different hash functions H can be used for different parents in the same tree. For a non-binary tree, the parent's value can be a hash function of a concatenation of all of the children values, or some other function of all or fewer than all of the children values. Other algorithms A in equation (2), which are not represented by means of trees, can also be suitable.

The term "tree" denotes any computer data structure together with a method for determining the parent from a child node or the children from the parent. The data structure may include pointers from the children nodes to the parent and/or from the parent to the children. Alternatively, the nodes may be arranged as an array or some other structure, with no pointers, but with a method, implemented by computer instructions, which determines the parent from a child node or the children from the parent.

Figure 14:
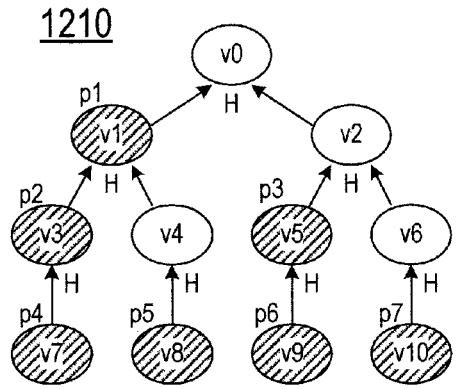
Figure 12:
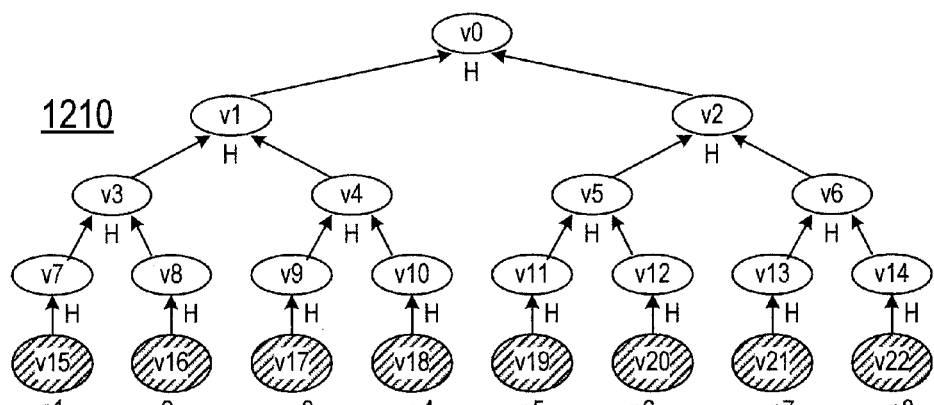
Figure 13:
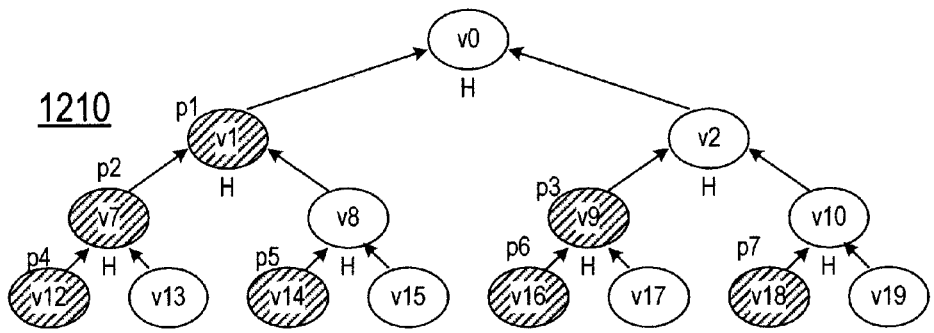

In some embodiments, the hash chains (1) are replaced with hash trees 1210 (FIGS. 12-14). See e.g. reference [24] and PCT publication WO 2005/029445 published on 31 Mar. 2005, both incorporated herein by reference. In FIG. 12, leafs v15-v22 are each associated with a time period pi. There are eight consecutive periods p1-p8 in this example. For instance, a certificate can be valid for eight days, and each period p1 through p8 can be one day. Let gv(i) denote the node corresponding to the period pi. Thus, gv(1)=v15, gv(2)=v16, etc. These nodes will be called "grey" nodes herein. Each grey node gv(i) is a single child of a respective parent v7-v14. Above the leaf level v15-v22, the tree 1210 is a balanced binary tree.

Figure 15:
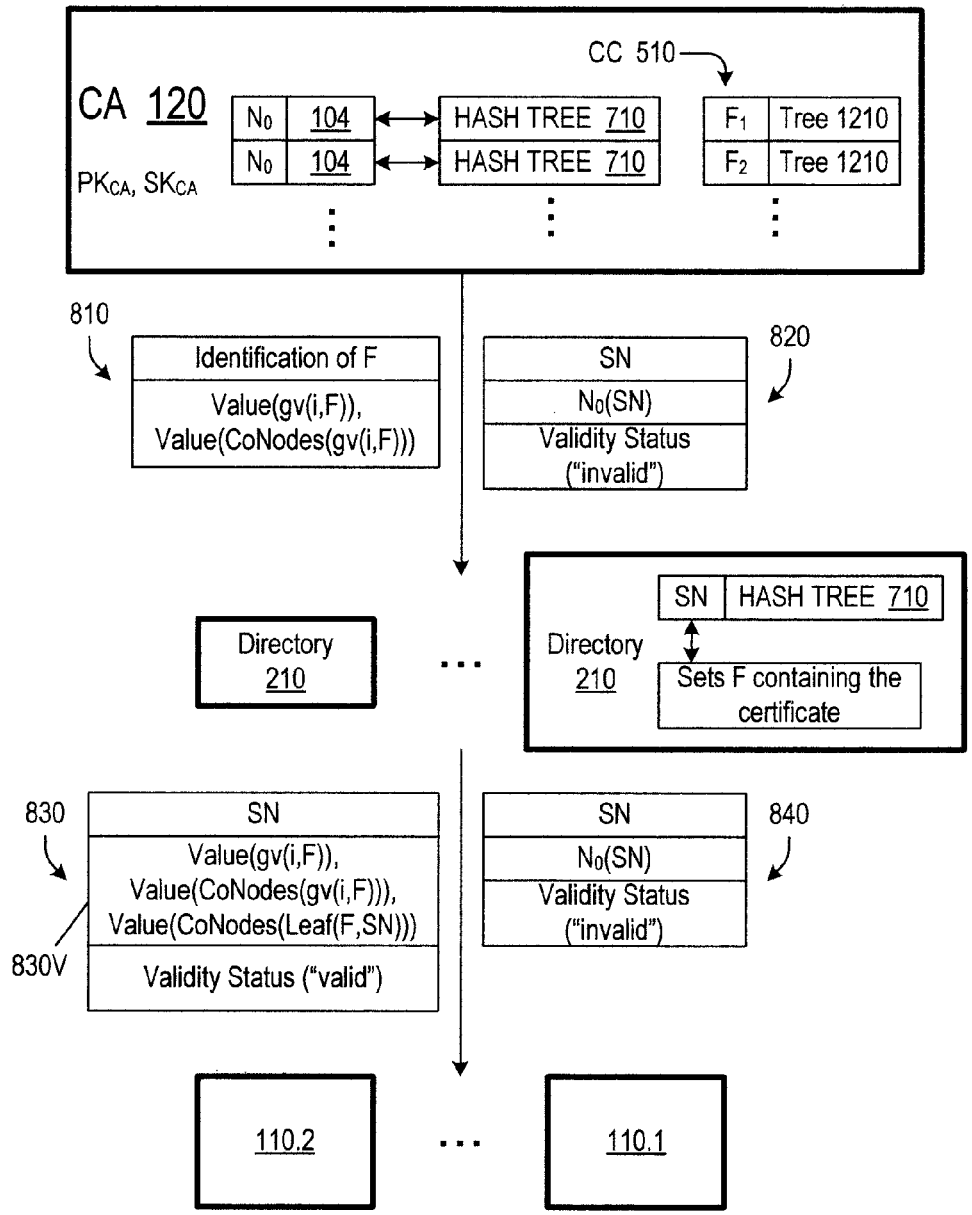
FIG. 15 is a block diagram illustrating networked computer systems and data structures for certificate revocation schemes according to some embodiments of the present invention.

Each leaf gv(i) is assigned a random or pseudo-random value. The remaining nodes' values are defined by the child nodes' values, using the equation (3) for example, i.e. each parent node's value is a hash function of a concatenation of the children values; at the bottom level, the value of each node v7-v14 is a hash function of the corresponding child. The root value Value(v0) will be called a target, and denoted by $c_0$. A separate tree 1210 is constructed by CA 120 for each set F of the complement cover CC (e.g. for CC 510), with different random leaf values generated separately for each tree 1210. FIG. 15 shows the trees 1210 replacing the hash chain information in CA 120.

For each certificate 104, a hash tree 710 (as in FIG. 7A) is constructed by the CA with the leaf values being the targets $c_0$(F) of trees 1210 corresponding to all the sets F containing the certificate. Each certificate 104 has a form as in FIG. 7B. The hash functions H for trees 1210 can be the same or different for the different trees 1210 and can be the same or different from the hash functions H of trees 710. The hash functions H are all public.

Figure 9:
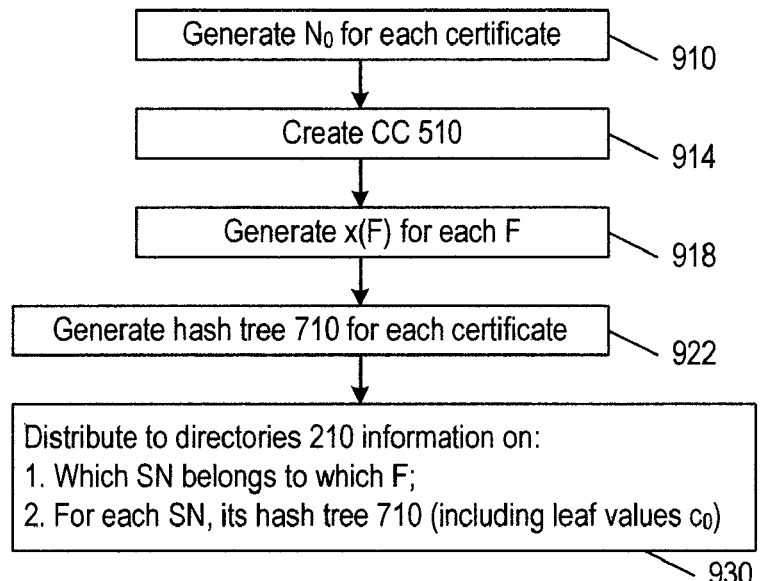
FIGS. 9, 10 are flowcharts for certificate revocation schemes according to some embodiments of the present invention.

The CA set up procedure (FIG. 16) is similar to FIG. 9, except that at step 918 the CA generates the tree 1210 for each leaf.

In each period pi, CA 120 determines a minimal complement cover $CC_R$ of the revoked certificates R using the same procedure as described above for FIG. 8. CA 120 distributes to directories 210 a possibly unsigned structure 810 (FIG. 15) for each set F in $CC_R$, and a possibly unsigned structure 820 for each invalid certificate 104. Structure 810 contains an identification of the set F and also contains, in field 830V, period data consisting of Value(gv(i,F)) and Value(CoNodes (gv(i,F))), where gv(i,F) is the node gv(i) of the tree 1210 corresponding to the set F. Structure 810 may also contain other information, such as an identification of period pi or function(s) H used to construct the tree 1210 or 710. Structure 820 contains the certificate's serial number SN, the value $N_0$ for the certificate, and an indication that the certificate has been revoked.

Figure 17:
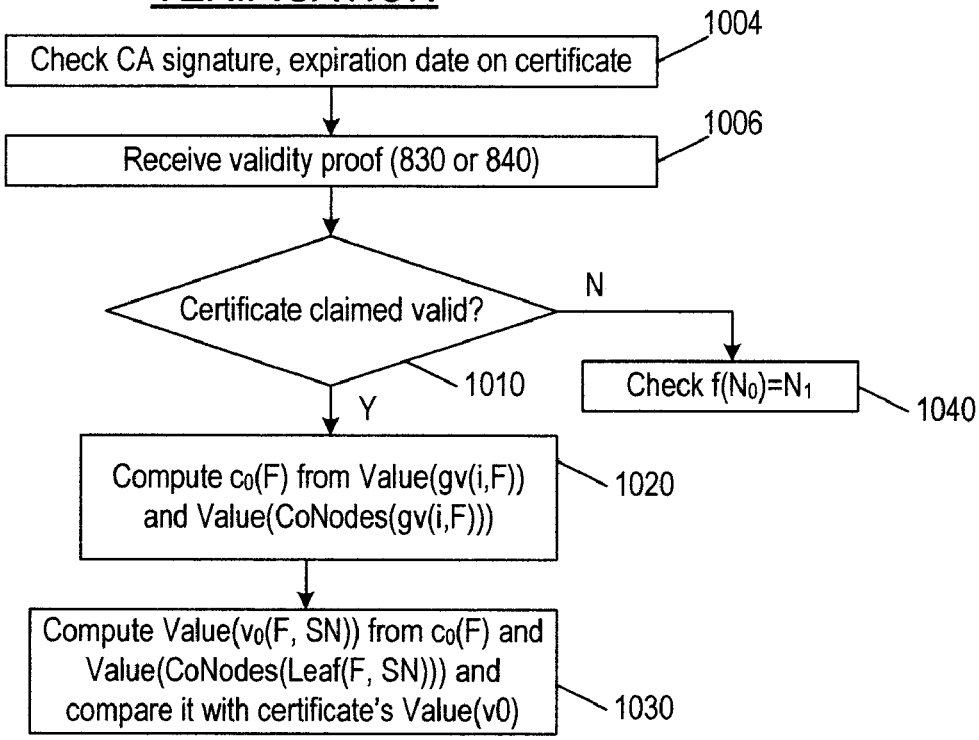

In response to a request from a verifier system 110, a directory 210 responds with a possibly unsigned data structure 830 if the certificate is valid, and a possibly unsigned structure 840 if the certificate is invalid. Structure 830 contains the certificate' serial number SN, an indication that the certificate is valid, and the values Value(gv(i,F)), Value(CoNodes(gv(i,F)), Value(CoNodes(Leaf(F,SN))). Here F is an element of $CC_R$ containing the SN certificate; Leaf(F,SN) is the leaf node corresponding to the set F of the certificate's tree 710. The verification procedure is shown in FIG. 17. Steps 1004, 1006, 1010, 1040 are as in FIG. 10. At step 1020, the verifier computes $c_0(F)$ from Value(gv(i,F)) and Value(CoNodes(gv(i,F))) that are given in structure 830. The computation can be as in Listing 1 above. At step 1030, the verifier computes Value($v_0$(F,SN)) from $c_0(F)$ computed at step 1020 and from Value(CoNodes(Leaf(F,SN))) given in structure 830. This computation can also be as in Listing 1. If the computed value equals the certificate's Value(v0), the certificate is assumed valid. Otherwise, the certificate is assumed invalid or the verifier may seek another proof of the certificate status.

FIG. 13 shows a "dense hash tree" 1210 which can be used instead of the tree of FIG. 12. The tree of FIG. 13 is a balanced binary tree. The periods pi are associated with "grey" nodes gv(i). The non-grey nodes will be called "white". The grey and white nodes are determined as follows. The root v0 is white. Its left child v1 is grey, and the right child v2 is white. In general, each left child is grey, and each right child is white. The grey nodes are traversed top-down, left-to-right, breadth first, and the consecutive gray nodes are assigned to consecutive periods pi. Thus, gv(1)=v1, gv(2)=v7, gv(3)=v9, and so on. All the leafs are assigned some random or pseudo-random values, and the parents' values are computed from the children's values like for FIG. 12 or for a tree 710. The operation of CA 120, directories 210 and the verifiers is as for FIG. 12.

FIG. 14 shows a "grounded dense hash tree" 1210 which can be used instead of the trees of FIGS. 12 and 13. The tree of FIG. 14 is similar to the tree of FIG. 13, but the tree of FIG. 14 has an additional bottom layer of single children, shown as v7-v10. The grey nodes gv(i) are the left children and the single children, numbered top to bottom and left to right, breadth first. The operation of CA 120, directories 210 and the verifiers is as for FIG. 12.

Suppose that there are $N=2^k$ certificates. Then the tree 510 has (1+k) levels, and each certificate belongs to (1+k) sets F. This is the number of validation targets $c_0(F)$. Hence, there are about $\log_2(1+k)$ levels in hash tree 710, with about the same number of co-nodes. Let us suppose that the certificate owner provides the certificate and the validity proof to a requester. Then the use of hash trees 710 provides an improvement by $O(k/\log_2 k)$. This is significant for large k.

In some embodiments, the certificate's targets $c_0$ are subdivided into groups of targets, and a separate hash tree 710 is defined for each group. The certificate contains the root value Value(v0) of each such hash tree. Other variations are also possible.

Redacting the Certificate

Figure 18:
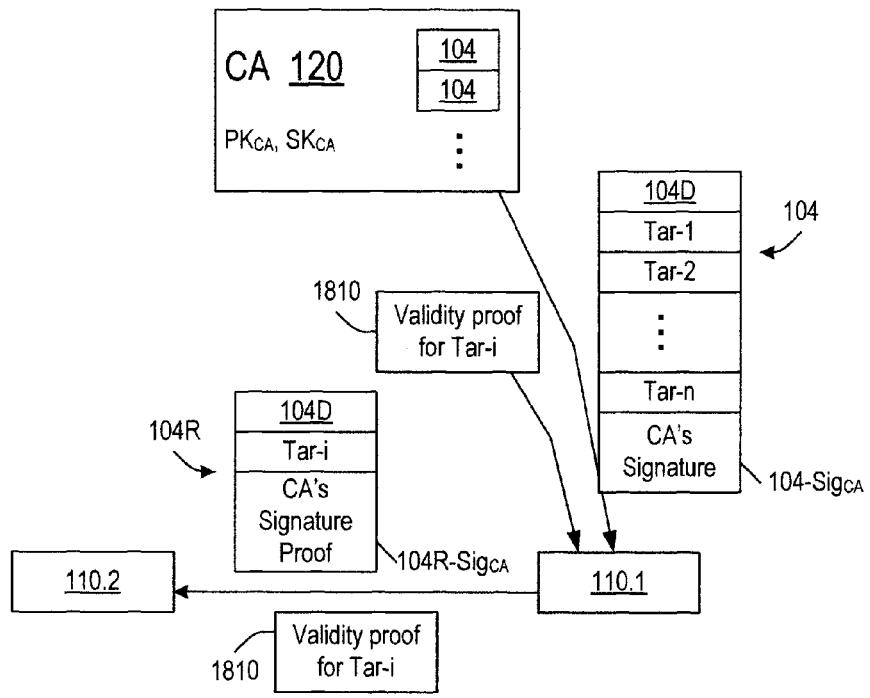
FIG. 18 is a block diagram illustrating networked computer systems and data structures for certificate revocation schemes according to some embodiments of the present invention.

As illustrated in FIG. 18, the validity proofs (1810) for each certificate can be distributed to the respective certificate owners (110.1). The validity proofs can be distributed by the CA, directories 210, or other parties. A third party (110.2) desiring to validate a certificate 104 can receive the validity proof 1810 from the certificate owner (110.1) rather than the CA. Sometimes, validity proof requests 150 (FIG. 1) are eliminated. For example, when a certificate owner 110.1 (i.e. a user of system 110.1) sends to party 110.2 a document (not shown) signed by the owner, the owner 110.1 can append the certificate 104 to the document to enable the party 110.2 to verify the owner's signature on the document even if the party 110.2 has not requested the owner's certificate. The owner 110.1 can also send to the party 110.2 a validity proof 1810 for the owner's certificate 104. See Gentry, "Certificate-Based Encryption and the Certificate Revocation Problem", Proceedings of EUROCRYPT 2003, pages 272-293, incorporated herein by reference.

Figure 7B:
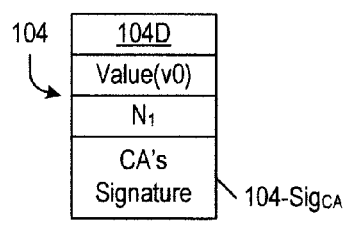

In FIG. 18, the certificate 104 includes multiple targets Tar-1, . . . . Tar-n. Each target can be a hash chain target $c_0(F)$ as in FIG. 3, or the root value of a tree 1210. Hash trees 710 are not used. Alternatively, a tree 710 can be used over some, but not all, of the validation targets $c_0$, and a target Tar-i may be the root value of the tree 710. The targets Tar-i may also include a revocation target $N_1$ (FIGS. 3, 7B). Other certificate schemes, known or to be invented, can also be used for this invention. A target is any value computable by a verifier 110.2 to determine if the certificate is valid and/or invalid.

At the start of, or shortly before, each period pi, the validity proof 1810 for the certificate 104 is provided (possibly pushed) to the certificate owner's computer system 110.1. Validity proof 1810 may have the same form as data 810 of FIG. 8 or 15. For the case of FIG. 15, the verifier would have to compute the root value of tree 1210 from the period data as in Listing 1 and compare the root value to a target Tar-i. Other validity verification schemes can also be used. We will assume that the verifier does not need all the targets Tar-i to verify the certificate's validity. The verifier may need just one target Tar-i as in FIG. 18, or may need more than one but less than all of the targets.

Figure 19:
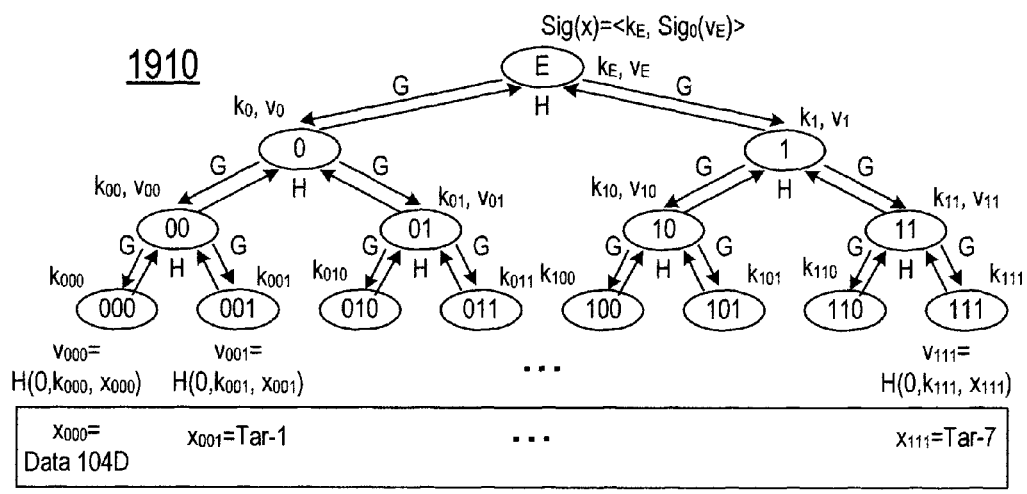
FIG. 19 illustrates computer data structures for certificate revocation schemes according to some embodiments of the present invention.

Certificate owner system 110.1 provides the validity proof 1810 to party (computer system) 110.2 together with the certificate 104. According to some aspects of the present invention, the party 110.1 redacts the certificate by deleting the unneeded targets to reduce the amount of data provided to party 110.2. The redacted certificate 104R includes a signature proof 104R-Sig$_{CA}$ to allow the party 110.2 to verify the CA's signature on the certificate. Party 110.1 does not have the CA's secret key. CA 120 uses a redactable signature scheme to enable the party 110.1 to provide the signature proof 104T-Sig$_{CA}$. Suitable redactable signature schemes are described in [12], and other schemes may be suitable, whether known or to be invented. One scheme is illustrated in FIG. 19. It is built on top of another signature scheme Sig$_0$, which can be any signature scheme, redactable or not. To form a redactable signature on a message x, the message is broken up into blocks $x_0, x_l, \ldots$ (eight blocks in FIG. 19). Each of these blocks can be deleted to redact the message. If the message x is a certificate 104, one block can be standard data 104D, and each of the other blocks can consist of one or more of the targets Tar-j. Alternatively, data 104D may correspond to a number of blocks, and so can each target. A binary tree 1910 is constructed having at least as many leafs as there are blocks in the message x. For convenience of reference, the tree's nodes are labeled with binary strings as follows. The root node is labeled with the empty string E. The root's left and right children are labeled with strings '0' and '1' respectively. In general, for a node labeled with a string s, the left child is labeled s0 (appending 0) and the right child is labeled s1.

Suppose each block of the message x has k bits (or less). Let G: $\{0,1\}^k \to \{0,1\}^{2k}$ be a pseudo-random generator. We assign a k-bit number $k_s$, to each node s as follows:

Listing 2
1. Pick $k_E$ uniformly randomly from $\{0,1\}^k$.
2. Recursively, for each node s, define $k_{s0}$ as the first k bits of $G(k_s)$, and $k_{s1}$ as the remaining k bits.

End of Listing 2.

Each leaf node s as assigned to a corresponding block $x_s$ of the message x (where "s" is interpreted both as a string and as a binary number). We define a hash tree structure on tree 1910, using some predefined hash function H, with a value $v_s$ assigned to each node s as follows. For the leaf nodes, $$v_s = H(0, k_s, x_s) \quad (6)$$

(the entities 0, $k_s$, $x_s$ are concatenated). If there are more leaf nodes than blocks $x_s$, the corresponding $v_s$ values can be generated randomly or pre-assigned (e.g. set to 0). For every non-leaf node s, $$v_s = H(1, v_{s0}, v_{s1}). \quad (7)$$

The redactable signature Sig(x) on the message x is defined as $$Sig(x) = \langle k_E, Sig_0(v_E) \rangle \quad (8)$$

If the message x is redacted by a deletion of some block $x_L$ for some string L, the signature proof (which will also be denoted as Sig(x)) is:

$$Sig(x) = \langle k\_Value(CoNodes(L)), v_L, Sig_0(v_E) \rangle \quad (9)$$

where k_Value(CoNodes(L)) is the set of the $k_s$ values for the nodes s in CoNodes(L). Clearly, k_Value(CoNodes(L)) is sufficient for the verifier to compute $k_s$ for the leafs other than L, and hence to compute $v_s$ for these leafs. The value $v_L$ is part of signature proof (9), so the verifier can compute $v_E$ from equation (7) and verify the base signature $Sig_0(v_E)$.

Multiple targets can be deleted sequentially. Alternatively, the following techniques can sometimes be used. Suppose we delete all the targets except Tar-1 (i.e. all the message blocks for the leafs 010 through 111 in FIG. 19). Then the $v_s$ values for the leafs 100 through 111 can be replaced with $v_1$, and for the leafs 010 and 011 with vol. Generally, if a sub-tree's leafs are all "deleted" (i.e. correspond to deleted blocks), the $v_s$ value for the sub-tree's root is inserted into the signature proof instead of the $v_s$ values for the leafs. In our example (delete blocks $x_{010}$ through $x_{111}$), the signature proof can be:

$$Sig(x) = \langle k_{00}, v_{01}, v_1, Sig_0(v_E) \rangle \quad (10)$$

(The signature proof Sig(x) may also include the label s for each $k_s$ and $v_s$ value, and other data as needed to interpret the components of the signature proof). This signature proof has all the information needed for the verification. If all the targets except Tar-7 are deleted, the signature proof can be:

$$Sig(x) = \langle k_{000}, v_{001}, v_{01}, k_{111}, v_{110}, v_{01}, Sig_0(v_E) \rangle \quad (11)$$

Here we delete six targets but add five k-bit values to the signature proof compared to the signature proof (8) for the original message x. The signature proof (11) can be shortened however if we provide $k_E$ instead of $k_{000}$ and $k_{111}$. In some prior applications, the value $k_E$ was not provided to hide the $k_s$ values for the deleted message blocks $x_s$ in order to make it harder for the verifier to determine the contents of the deleted blocks. In some embodiments, however, the certificate owner 110.1 does not try to hide the deleted targets, thus allowing a shorter signature proof to be constructed. Moreover, $k_E$ can be a public constant rather than randomly generated since the signature security is provided by the base signature scheme $Sig_0$. In this case, the $k_E$ value does not need to be provided as part of the signature proof. Further, the function G does not have to be a pseudorandom generator.

In some embodiments, the certificate owner 110.1 first checks if the redacted certificate 104R is smaller than the non-redacted certificate 104. The certificate owner sends to party 110.2 the shortest of the two certificates. In another embodiment, the certificate owner 110.1 sends the shortest among the certificate 104 and all the redacted certificates containing the target Tar-i (deleting fewer than all of the unneeded targets may provide a shorter certificate than deleting all of the unneeded targets).

Multicast Distribution of Validity Proofs

Pushing validity status information can be advantageous in ad hoc networks. An ad hoc network is a self-configuring wireless network of systems 110 (FIG. 20) each of which also serves as a router. In each period pi, a directory or directories 210 push the validity proofs 1810 to the systems 110 of the owners of the respective certificates. For large well-chosen complement cover families, the number of validity proofs 1810 needed to be distributed is relatively small and therefore, periodic validation status information can be distributed efficiently over the network. Broadcasting and multicasting can be used for efficient distribution. In some embodiments, a multicasting group 2010 of systems 110 is created for each set F in the complement cover CC(U) if the set F has more than one certificates or at least some minimum number of certificates. The certificate owners 110 with certificates 104 in the set F subscribe to the corresponding multicasting group. A validity proof 1810 for the set F can be efficiently distributed via a multicast transmission to the group. If a set F contains all the certificates, the validity proof 1810 can be broadcast. As used herein, the term "multicasting" includes broadcasting.

In some embodiments, CA 120 generates a complement cover CC(U) taking into account possible multicasting groups 2010. For example, a separate set F can be created for each multicasting group 2010. The set F will consist of certificates 104 owned by operators of stations 110 in the multicasting group 2010. Also, when CA 120 generates a complement cover $CC_R$ of the revoked certificates, CA 120 may preferentially choose the sets F corresponding to multicasting groups 2010. In some embodiments, the sets F are assigned priorities, with a higher priorities assigned to sets F corresponding to multicasting groups 2010. The priorities may also depend on other factors. In some embodiments, $$Priority(F_1) \geq Priority(F_2) \text{ if } F_1 \supseteq F_2 \quad (12)$$

CA 120 first selects the sets F of the highest priority when generating the complement cover $CC_R$, then the sets F of the next highest priority, and so on. In other embodiments, CA 120 maximizes the sum of the priorities of the sets F in $CC_R$. Other schemes for taking the multicasting groups into account can also be used.

Suppose for example that the complement cover CC(U) includes the sets F of FIGS. 5-6 and also includes a set $F_0$ consisting of certificates $\{1,5\}$. Suppose there is a multicasting group 2010 including, or consisting of, computer systems 110 of the owners of certificates 1 and 5. Suppose the set of revoked certificates is $\{3, 8\}$ as in FIG. 6. The minimal complement cover $CC_R$ consists of sets $\{1-2\}$, $\{4\}$, $\{5-6\}$, $\{7\}$ as described above. If none of these four sets corresponds to a multicasting group 2010, then directories 210 would have to perform 6 unicast transmissions (one transmission for each valid certificate) to push the validity proofs 1810 to the certificate owners (assuming each certificate is owned by a different owner operating a separate system 110). If the set $F_0$ has a higher priority, the CA may form a complement cover $CC_R$ consisting of sets {1,5}, {2}, {4}, {6}, {7}. The directories 210 will need to perform only five transmissions of proofs 1810 to the certificate owners because the proof for the set {1,5} can be pushed via a multicast transmission.

In some embodiments, a set F may correspond only approximately to a multicasting group 2010. The set F may contain some, but not all, of the certificates associated with a group 2010. The set F may receive a higher priority if F contains more than one certificates associated with a multicasting group of systems 110. In some embodiments, Priority (F) is proportional to the number of such certificates. ("Proportional to" means "increases with" and does not necessarily mean "directly proportional").

In some embodiments, CA 120 may or may not take the multicasting groups into account, but the network of stations 110 forms at least some of multicasting groups 2010 based on the sets F. For example, a multicasting group 2010 can be formed for each set F containing more than one certificates. In another embodiment, each set F containing more than one certificate is assigned a priority Prt(F) representing the expected frequency, or the expected number of periods pi, in which F will be an element of $CC_R$. Multicasting groups 2010 are created only for the sets F of high priorities Prt. The priority Prt(F) may depend on, and be proportional to, a number of factors including, without limitation:
1. The number of certificates in the set F.
2. The sum $\Sigma(D2-pi)$ of the remaining unexpired periods of the certificates in the set F in the period pi, or $\Sigma D2$. If D2 is infinite, some predefined high number can be assigned to the corresponding certificate when computing this sum.

When a system 110 joins the network, the system 110 may form a multicasting group 2010 for one or more of such sets F, e.g. for at least one set F containing a certificate 104 owned by the operator of system 110. Alternatively, the multicasting groups can be formed in advance, and the system 110 joining the network may subscribe to one or more, and possibly all, of multicasting groups 2010 associated with sets F containing the certificate corresponding to the system 110.

The invention is not limited to ad hoc networks.

Caching Validity Proofs

In ad hoc networks and other networks in which at least some of systems 110 serve as routers, when a verifier system 110 (e.g. 110.1) needs a certificate's validity status (possibly for a certificate not owned by the operator of system 110.1), the verifier's request 150 (FIG. 1) may travel over a number of other systems 110 on the way to a directory 210 or CA 120. Therefore, in some embodiments, when a verifier system 110.1 receives a validity proof 1810, the system 110.1 may cache the validity proof in its cache 2110 (FIG. 21A). When another verifier 110.2 issues a request 150 for the same certificate, or for a certificate in the same set F (if complement covers are used), and the request reaches the caching system 110.1, the system 110.1 may send the cached response to the system 110.2 without forwarding the response to a directory 210 or CA 120. Since caches 2110 have a limited size, the caching system 110.1 may cache only selected validity proofs 1810 expected to satisfy many requests 150 issued in the current period pi. In some embodiments, the system 110.1 uses the "least recently used" caching policy, giving priority to the validity proofs 1810 for the certificates for which a validity proof was most recently provided by system 110.1 to other systems 110. Other caching strategies, known or to be invented, can also be used. In some embodiments, the sets F are assigned caching priorities Prt1(F) representing the caching desirability of the respective proofs 1810. In some embodiments, the caching priority Prt1(F) is proportional to:
1. The number of certificates in the set F.
2. The sum $\Sigma(D2-pi)$ of the remaining unexpired periods of the certificates in the set F in the period pi, or $\Sigma D2$. If D2 is infinite, some predefined high number can be assigned to the corresponding certificate when computing this sum.

When system 110.1 receives a proof 1810 (step 2120 in FIG. 21B), the verifier 110.1 processes the proof 1810 to verify the certificate's validity (the invention is not limited to any verification method). In addition, system 110.1 decides, at step 2130, if the proof 1810 should be cached. The caching decision depends on the caching priority Prt1 (F) of the set F corresponding to proof 1810, and may depend on other factors, such as the amount of free memory in cache 2110. In some embodiments, the caching decision is negative if the proof 1810 fails to prove the certificate's validity at step 2120. If the caching decision is positive, the proof 1810 is cached in cache 2110 of system 110.1 (step 2140), and otherwise the proof 1810 is discarded (step 2150).

The caching is not limited to the cases when the validity proofs are pushed to the certificate owners. Validity proofs 1810 may be identical to proofs 830 of FIG. 8 or 15, or may have other forms. The caching may be done by non-router systems 110.1 which may get requests 150 from other systems 110. For example, if a system 110.2 has failed to get a validity proof from the CA or a directory 210 (due to a network failure or for some other reason), or if the system 110.2 has obtained a validity proof but the validity proof has failed (e.g. a computed target did not match the certificate's target), then the system 110.2 may issue a broadcast request to a local network, and receive a validity proof 1810 from another system 110.1 which has cached the proof.

Figure 1:
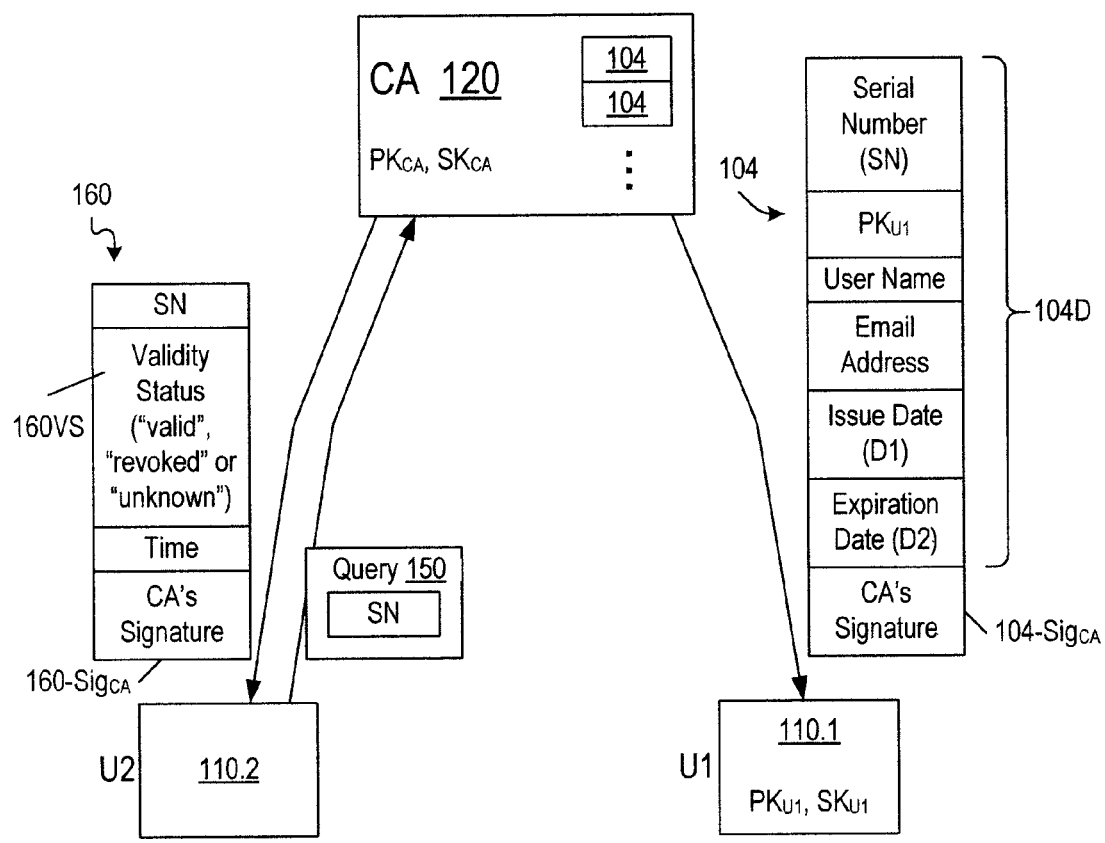
FIGS. 1, 2 are block diagrams illustrating prior art certificate revocation schemes.
Figure 2:
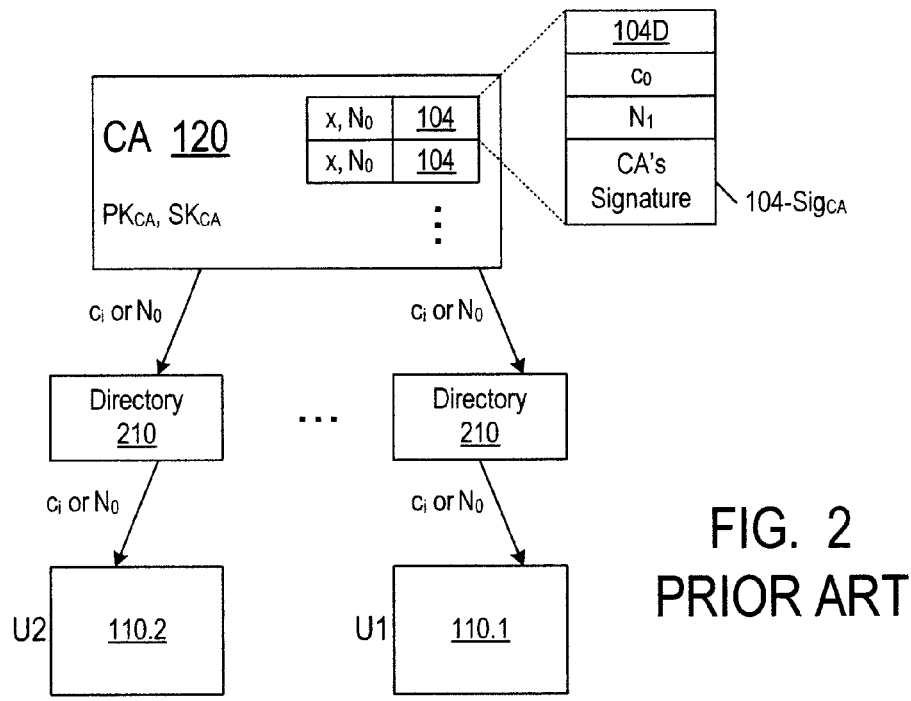

In some embodiments, the caching scheme of FIG. 21 is used in systems in which the validity proofs are pushed to the certificate owners and some certificate owner (e.g. 110.2) enters the network after the distribution of validation status information 1810 for a certain period pi. The certificate owner 110.2 then requests its validity proof 1810 from CA 120 via a request 150 (FIG. 1). If an intermediate node 110.1 maintains a validation status information cache 2110, the intermediate node searches the cache for validation status information for the requested certificate. If the search is successful, the respective validation status information is transmitted to the requestor. Otherwise the request is forwarded to CA 120.

Dynamic Introduction of New Certificates

Figure 16:
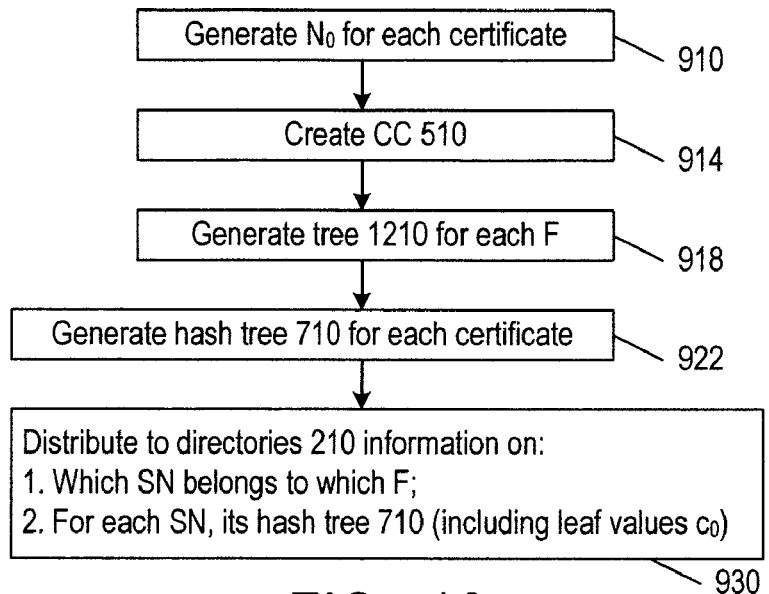
FIGS. 16, 17 are flowcharts for certificate revocation schemes according to some embodiments of the present invention.

It is desirable to allow addition of new certificates after the setup stage (e.g. the stage illustrated in FIG. 9 or 16). Hash chains (1) and hash trees 1210 (FIGS. 12-14) each accommodate a predefined number of periods pi. In some embodiments, a certificate revocation system is provided which allows addition of new certificates at any time after the setup, with additional pi periods. Let M be a maximum number of certificates in the setup phase, and suppose each certificate is to be issued for some number Tv of periods pi (Tv is the maximum validity period D2-D1, expressed as the number of the pi periods). The periods pi are marked on the Time axis 2210 of FIG. 22. In the setup phase, CA 120 creates M certificate slots even though the actual number of certificates may be less than M. Some slots are assigned to the actual certificates, and the remaining slots are empty. FIG. 23A shows how some of the setup steps of FIGS. 9, 16 are adapted for dynamic introduction of the new certificates. The remaining steps are not shown and can be as in FIG. 9 or 16. At step 914, CA 120 creates a complement cover CC(U) for the M certificate slots (if the complement covers are used; the invention is not limited to use of complement covers). At step 918, CA 120 generates a hash chain (1) or a hash tree 1210 for some number Td of periods pi for each set F in the cover CC(U). Td>Tv. In the example of FIG. 22, Td=2*Tv. The remaining setup steps 922, 930 can also be performed. Alternatively, the invention can be practiced without the hash trees 710.

If hash chains (1) are used, the target $c_0=f^{Td}(x)$ where x is the seed. The validity proof provided to verifiers 110 includes a token $c_i$ and the number j of times that the function f is to be applied to the i-token $c_i(F)$. The verifier checks that $f^j(c_i)=c_0$.

The periods 1 though Tv will be called a "Tv window" herein. If a certificate is created in this window, it will expire on or before Td, and hence can be used with the data structures (hash chains (1) or hash trees 1210) created by CA 120 at step 918. More generally, a Tv window is a window in which a new certificate can be accommodated by the existing data structures for a predefined time interval of a number of the pi periods, i.e. the certificate will not last beyond the last pi period provided for by the data structures. In the embodiment of FIG. 22, the first Tv window is a window from pi=1 to pi=Td−Tv. In FIG. 22, the certificate expiration times D2 are shown with crosses.

A "Td window" starts at the same time as a corresponding Tv window and ends Td periods later, denoting the outside bounds of the maximum validity period of each new certificate created in the Tv window.

FIG. 23B shows operation of CA 120 after the setup stage. If a new certificate is requested, at step 2330, in the current Tv window, and an empty certificate slot exists (step 2340), then CA 120 assigns the new certificate to an empty slot (step 2350). The new certificate is valid for Tv periods pi beginning with the current pi, and may expire after the current Tv window. If there are no empty slots, CA 120 performs the setup again (step 2360). In particular, a new complement cover CC(U) is created for M new certificate slots, and the hash chain (1) or hash tree 1210 is created for each new set F of the new complement cover for a new Tv window of Td periods pi starting with the current (or the next) period pi. The new Tv window becomes the current Tv window. The remaining setup steps (e.g. creation of trees 710) can also be performed. Control returns to step 2330. Since the empty slot exists at step 2340 (M new slots have just been created), the new certificate is assigned to one of the new slots. Control returns to step 2330.

If CA 120 has not run out of empty slots until the end of the current Tv window, step 2360 is performed at the end of the window.

CA 120 and directories 210 provide the validity proofs both for the current Td window and for all the previous Td windows which have not yet expired. When a Td window expires, the corresponding data structures can be re-used. The data structures associated with an expired certificate (e.g. the hash chains (1) or the hash trees 1210) can be re-used even before the corresponding Td window expires.

FIG. 24 illustrates an embodiment in which different certificates 104 may have different maximum validity periods D2−D1 (FIG. 1). Maximum validity periods are shown as Tv1, Tv2 for certificates created at respective times t1, t2. In this embodiment, it is required for the maximum validity period to be at least as long as a predefined number Tvmin. FIG. 25 shows how the setup step 918 is modified for this embodiment. At step 918, CA 120 creates the hash chains (1) or hash trees 1210 for a fixed number Td>Tvmin of periods pi for M certificate slots. Therefore, the certificates can be added to the setup data structures until the time (Td−Tvmin), which marks the end of the first Tv window. A certificate added in any period pi to the hash chain or hash tree data structures can be accommodated by the data structures for up to (Td−pi) of the pi periods. In some embodiments, the certificate's maximum validity time is set to (Td−pi), e.g. by setting D2 to (D1+Td−pi). In other embodiments, the maximum validity time is not allowed to exceed some predefined number Tvmax>Tvmin of the pi periods. In some embodiments, Td>Tvmax. The CA operation after the setup stage is as in FIG. 23.

The invention is not limited to hash trees 1210 or hash chains.

Distributed Certificate Authority

A single CA 120 can be vulnerable to denial of service attacks and can be unavailable in the case of network errors. In some embodiments, a Distributed Certificate Authority (distCA) described below minimizes those drawbacks while maintaining the security of the overall system.

A distCA includes a CA 120 (FIG. 26) and some number "S" of Sub-CAs 2610 (i.e. 2610.1, . . . 2610.S). In the setup phase, Sub-CAs 2610 receive secret data from CA 120, but the data are encrypted. The data corresponding to different periods pi can be encrypted such that the decryption requires different keys. CA 120 distributes the required decryption keys for each period pi at the beginning, or shortly before, the period pi. In some embodiments, the distributed CA has the following advantages:

1. The verifier 110 can get a validity or invalidity proof for a certificate from any Sub-CA 2610. Therefore, in the case of network failures, chances are higher to obtain the proof of validity or invalidity.
2. Less vulnerability to successful denial-of-service attacks in each period pi because, as described below, less data need to be exchanged with CA 120 in each period pi (the decryption key distributed to Sub-CAs 2610 can be smaller than all of the period data such as i-tokens).
3. Compromising one of Sub-CAs 2610 does not compromise the whole system.
4. A compromised Sub-CA 2610 can be reactivated after it is back in control of CA 120.
5. The additional computational work performed by the verifier to validate a certificate is small compared to a digital signature computation.

Some embodiments do not provide all of the advantages described above. Some embodiments provide additional advantages, as described below.

Figure 26:
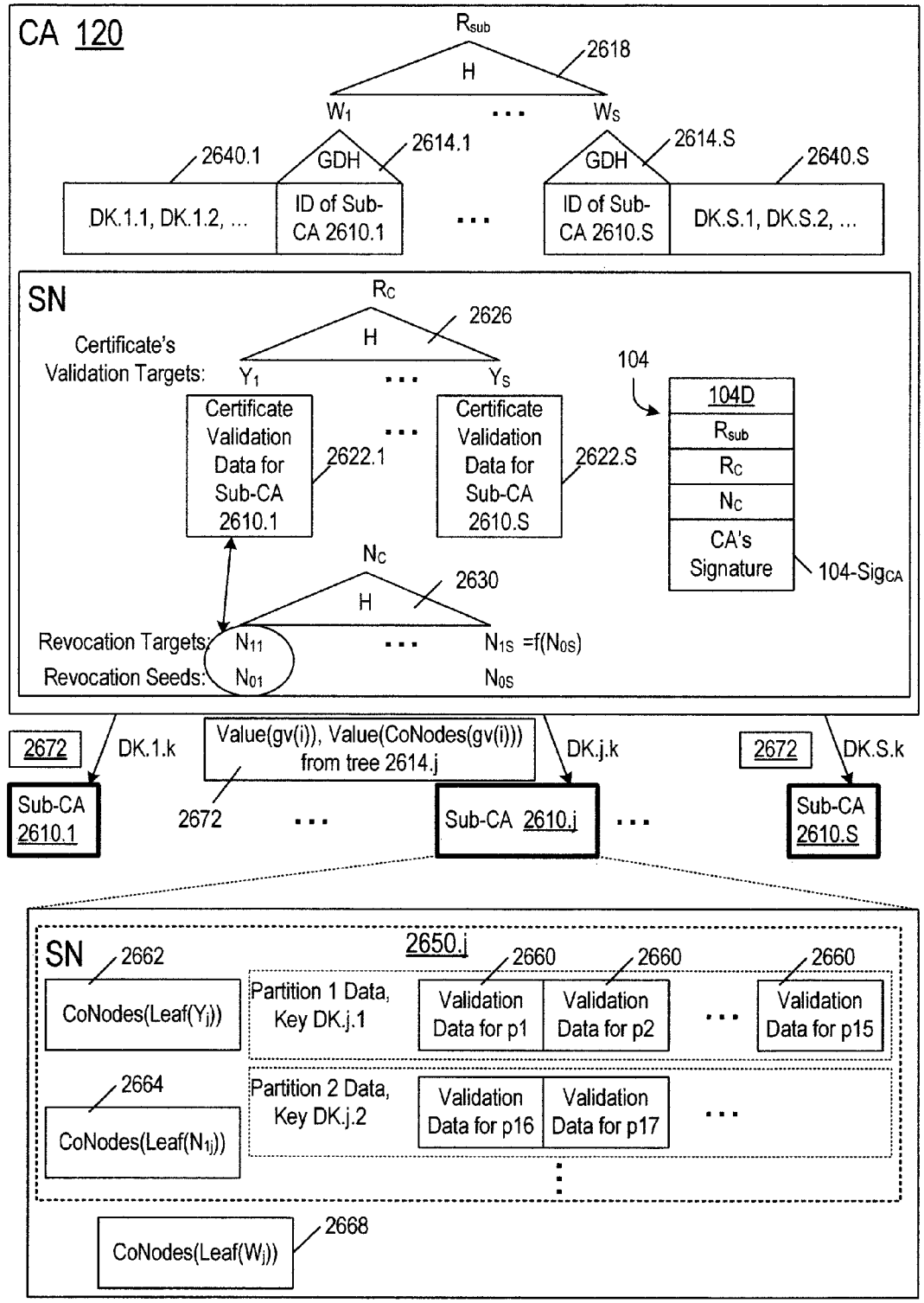
FIG. 26 is a block diagram illustrating networked computer systems and data structures for certificate revocation schemes according to some embodiments of the present invention.
Figure 27:
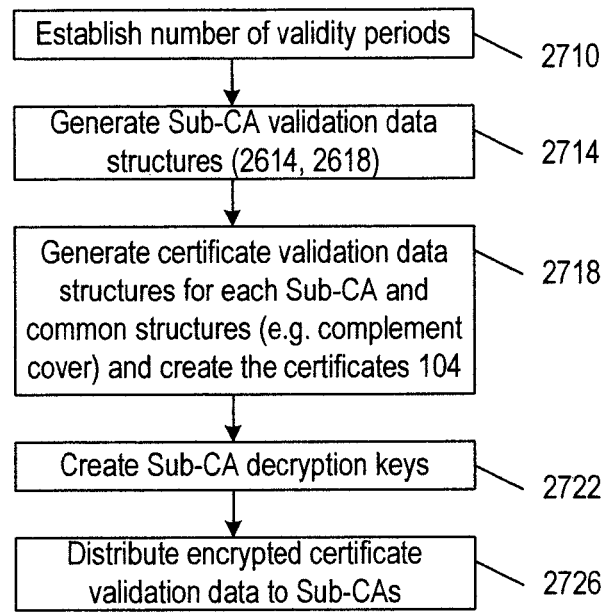
FIG. 27 is a flowchart for certificate revocation schemes according to some embodiments of the present invention.

FIG. 27 illustrates the CA set up phase. At step 2710, CA 120 establishes the validation periods p1, p2, . . . pt for some t. At step 2714, CA 120 generates data structures for verifying the Sub-CA validity in each period pi. The same kind of structures can be used as for the certificate validation. See e.g. FIGS. 1-17. In the example of FIGS. 26-27, hash trees 2614.1, . . . 2614.S are created for the respective Sub-CAs 2610.1, . . . 2610.S. Each tree 2614 can be of the same form as a tree 1210 in any one of FIGS. 12-14, with grey vertices gv(1), . . . gv(t) for the respective periods p1, . . . pt. In FIG. 26, trees 2614 are grounded dense hash trees ("GDH", as in FIG. 14), but other kinds of trees, or simply hash chains (1), can also be used. The leaf values are generated randomly separately for each tree 2614. Let $W_j$ denote the root value of tree 2614.j. We will refer to the $W_j$ values as validation targets. A hash tree 2618 (which can be of the same form as a tree 710 of FIG. 7A or FIG. 11) is defined whose leaf values are validation targets $W_j$'s. Let $R_{sub}$ denote the root value of tree 2618. $R_{sub}$ is inserted into each certificate 104.

This embodiment does not use revocation targets $N_1$ for the Sub-CAs. Lack of a validity proof is taken as proof that the Sub-CA is invalid. Other embodiments use explicit revocation proofs for the Sub-CAs. As mentioned above, in some embodiments an invalid Sub-CA can be re-activated in a subsequent period pi. Therefore, in some embodiments, the revocation proof is constructed using a technique suitable for validity proofs. For example, trees like 2614, 2618 can be used to prove a Sub-CA invalidity in each period pi.

At step 2718, CA 120 creates data structures for certificate validation and revocation. Any of the certificate validation and revocation techniques can be used, including the techniques described above with respect to FIGS. 1-25 and other techniques, known or to be invented. In the example of FIG. 26, a separate data structure 2622.j is created for each certificate for the respective Sub-CA 2610.j (so that if one Sub-CA is compromised, the remaining Sub-CAs' data structures 2622 remain secure). For example, each structure 2622.j can include a tree 1210 for the periods pi for the certificate (when complement covers are not used), or a combination of (a) the trees 1210 for the complement cover sets F containing the certificate with (b) a hash tree 710 over the targets of the trees 1210. See FIGS. 7A-17. For each structure 2622.j, the corresponding trees 1210 have different, randomly generated leaf values, so different structures 2622.j are not recoverable from one another. In FIG. 26, each structure 2622.j has its own validation target $Y_j$ ($Y_j$ can be the root value of the corresponding tree 710 or 1210, or can be a hash chain target), a revocation seed $N_{0j}$, and a revocation target $N_{1j}=f(N_{0j})$. CA 120 defines a hash tree 2626 (e.g. like in FIG. 7A or 11) over the root values $Y_j$. Let $R_C$ denote the root value of tree 2626. $R_C$ is inserted into the certificate.

CA 120 also defines a hash tree 2630 (e.g. like in FIG. 7A or 11) over the revocation targets $N_{1j}$. Let $N_C$ denote the root value of tree 2630. $N_C$ is inserted into the certificate. The certificate is signed by CA 120 as shown at 104-$Sig_{CA}$.

The certificate validation structures may also include structures common for the Sub-CAs, e.g. structures defining a complement cover CC(U) if the same complement cover is used for all the Sub-CAs.

In some embodiments, a separate structure 2622.j is created for each set F of a complement cover rather than each certificate. This could be done, for example, for the systems of FIGS. 4-6 (no hash trees 710). Also, each structure 2622.j may include multiple validation and/or revocation targets. A separate hash tree 2626 can be created for a set of targets which includes one target from each structure 2622.j. For example, if the certificates include the targets $c_0(F)$, then a separate hash tree 2626 can be created over all the targets $c_0(F)$ for a given set F for all the Sub-CAs. Alternatively, a single tree 2626 can be created for all of the targets. Some embodiments have no targets, and there is no tree 2626. Many validation structure types can be used.

At step 2722, CA 120 generates encryption and decryption keys 2640.j for each Sub-CA 2610.j. In this embodiment, for each Sub-CA 2610.j, one decryption key is used for a number of consecutive periods pi. For example, suppose there are 365 periods pi subdivided into P=25 logical partitions. 365/25=14$^{10}$/25, so we can place the periods p1 through p15 into Partition 1, periods p16 through p30 into Partition 2, and so on. The last Partition 25 has periods p361 through p365. The invention is not limited to the partitions having any particular number of periods. For each Sub-CA 2610.j and each partition k, CA 120 generates a decryption key DK.j.k. The encryption scheme may be symmetric (i.e. the encryption keys may be the same as the decryption keys) or asymmetric.

At step 2726, CA 120 uses the data 2622, 2626 to create certificate validation data 2650.j for each Sub-CA 2610.j. CA 120 encrypts the data 2650.j and sends it to the respective Sub-CAs 2610.j. For each j, data 2650.j includes a data structure 2660 for each period pi. In some embodiments, the data 2660 are the same as the data 830V (FIGS. 8, 15) for the validity proofs 830. In one example which uses a tree 1210 for each certificate 104 and does not use complement covers, data 2660 consists of Value(gv(i)) and Value(CoNodes(gv(i))). In some embodiments, the data 2660 for each period pi may be reduced in size by deleting the co-node values and other information present in data 2660 for the preceding periods pi.

For each Sub-CA 2610.j and each partition k, the data 2660 are encrypted for decryption with the key DK.j.k.

Optionally, for each certificate 104, CA 120 distributes to each Sub-CA 2610.j, and/or the certificate owner and/or other parties, data 2662 needed to compute the validation target $R_C$ from the corresponding target $Y_j$. Data 2662 may include Value(CoNodes(Leaf($Y_j$))) where Leaf($Y_j$) is the tree 2626 leaf corresponding to Sub-CA 2610.j. Optionally, for each certificate 104, CA 120 distributes to each Sub-CA 2610.j, and/or the certificate owner and/or other parties, data 2664 needed to compute the revocation target $N_C$ from the corresponding target $N_{1j}$. Data 2664 may include Value(CoNodes (Leaf($N_{1j}$))) where Leaf($N_{1j}$) is the tree 2630 leaf corresponding to Sub-CA 2610.j. Optionally, CA 120 distributes to each Sub-CA 2610.j, and/or each certificate owner and/or other parties, data 2668 needed to compute the target $R_{sub}$ from the corresponding target $W_j$. Data 2664 may include Value(CoNodes(Leaf($W_j$))) where Leaf($W_j$) is the tree 2618 leaf corresponding to Sub-CA 2610.j. Data 2662, 2664, 2668 need not be encrypted. Optionally, CA 120 can make public all or some of validation targets $W_j$, $Y_j$, $N_{1j}$. CA 120 can also provide these targets, for each j, to the respective Sub-CA 2610.j.

At, or shortly before, the start of each period pi, if pi is the first period in a partition k, CA 120 distributes, for each j, the decryption key DK.j.k to Sub-CA 2610.j. If a Sub-CA has been compromised and has not returned under control of CA 120, CA 120 may withhold the decryption key from the CA.

If a Sub-CA 2610.j is compromised, the adversary may have access to all the data structures 2650.j. However, the data 2660 are encrypted, and the adversary will hopefully not be able to decrypt the data 2660 for the future partitions. Therefore, once the Sub-CA 2610.j is back under the CA's control, CA 120 can reactivate the Sub-CA in the first period pi of the next partition. Reactivation implies that CA 120 will (a) provide the validity proof 2672 for the Sub-CA and (b) will provide the Sub-CA with (b1) the decryption key DK.j.k for the current partition k, and (b2) the decryption keys for all the preceding partitions if the keys were withheld when the Sub-CA was out of the CA's control and if the data 2660 for the preceding partitions are needed to construct certificate validity proofs.

At, or shortly before, each period pi, CA 120 sends to each Sub-CA 2610.j, and/or each certificate owner and/or other parties, a validity proof 2672 to prove the Sub-CA validity in the period pi. Validity proof 2672 includes Value(gv(i)) and Value(CoNodes(gv(i))) for the corresponding tree 2614.j. In addition, CA 120 sends to each Sub-CA 2610.j the revocation seed values $N_{0j}$ for each certificate 104 which has been revoked in the previous period pi (or in any of the previous periods pi).

At, or shortly before, each period pi which is the first period of a partition, each Sub-CA 2610 which has not been compromised uses the corresponding decryption key to decrypt the validation data 2660 for the partition.

Figure 28:
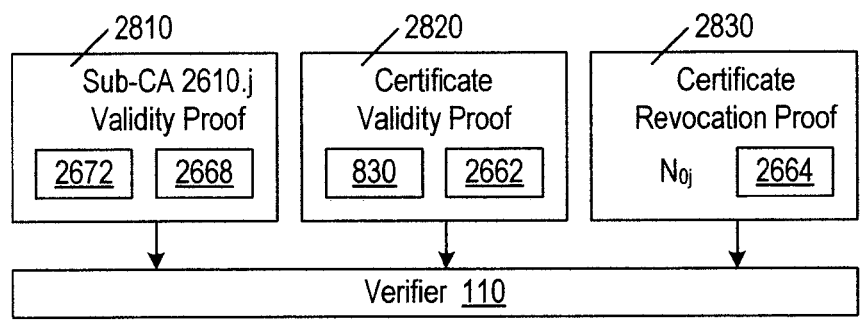
FIG. 28 is a block diagram illustrating networked computer systems and data structures for certificate revocation schemes according to some embodiments of the present invention.

In a period pi, a verifier 110 (FIG. 28) receives, from a Sub-CA 2610.j or another party, the Sub-CA's validity proof 2810. The verifier also receives either a certificate validity proof 2820 or a certificate revocation proof 2830 for the certificate of interest. The validity proof 2810 includes data 2668, 2672 (FIG. 26) for the Sub-CA 2610.j. The verifier computes the Sub-CA's target $W_j$ from the data 2672 (see Listing 1 above), and then the target $R_{sub}$ from the data 2668. If the computed value $R_{sub}$ matches the $R_{sub}$ value in the certificate, the Sub-CA is assumed to be valid. Otherwise, the verifier may seek the Sub-CA validity proof from another source, or simply assume the Sub-CA to be invalid and seek the certificate validity data from another Sub-CA.

Certificate validity proof 2820 includes a validity proof 830. The validity proof 830 is constructed from decrypted data 2660. The form of proof 830 depends on the underlying certificate validity scheme, and may be as in FIG. 8 or 15 for example. Other validity schemes can also be used, including for example the scheme of FIG. 2 and other schemes, known or to be invented. If the verifier receives validity proof 2820, the verifier computes the target $Y_j$ from data 830, and then the target $R_C$ from the data 2662. If the computed value $R_C$ matches the $R_C$ value in the certificate, the certificate is assumed to be valid. Otherwise, the certificate is either assumed to be invalid or the verifier may seek another proof, for example by contacting another Sub-CA.

Certificate revocation proof 2830 includes a revocation seed $N_{0j}$ and data 2664. If the verifier receives revocation proof 2830, the verifier computes the revocation target $N_{1j}=f(N_{0j})$, and then the target $N_C$ from the data 2664. If the computed $N_C$ value matches the $N_C$ value in the certificate, the certificate is assumed to be revoked. Otherwise, the verifier may still assume the certificate to be revoked, or seek another proof, for example by contacting another Sub-CA.

In each case when a target is to be computed from the co-node values (e.g. when the target $W_j$ needs to be computed), if the verifier has already verified the same certificate for a previous period pj and has cached the co-node values, and the grey vertices for the period pj and the current period pi are in a common sub-tree whose root value has been cached as the value of one of the co-nodes, then the verifier needs only to compute the root value for the sub-tree and compare it to the cached value rather than computing the root value for the tree. For example, if a sub-tree root value has been cached for a tree 2614.j, the verifier does not need to compute $W_j$ or $R_{sub}$ (provided that the verifier has all the pertinent information on the tree structure and not just a listing of type (5)).

Some embodiments use directories 210 (FIG. 15). Sub-CAs 2610 form validity proofs 810, revocation proofs 820, and possibly Sub-CA validity proofs 2810 and distribute them each period pi to directories 210. The directories construct proofs 2820, 2830 and send them to the verifiers. In some embodiments, a directory 210 receives data from only one or two Sub-CAs since the verifier will need the validity proof from only one valid Sub-CA. Other proof distribution schemes are also possible. In particular, some or all of data 2810, 2820, 2830 can be provided by CA 120, by the certificate owner, or by another party, e.g. another system 110 in an ad hoc network if that other system 110 has cached some or all of data 2810, 2820, 2830.

In some embodiments, each partition consists of one period pi. Different Sub-CAs 2610 have different decryption keys DK.j.i for each period pi. Sub-CA validity verification is then omitted. If a Sub-CA is compromised, CA 120 revokes the Sub-CA by stopping to send the decryption keys to the Sub-CA. When the Sub-CA is back in control of the CA, the CA can reactivate the Sub-CA by sending to it the retained decryption keys. Hence, the data 2614, 2618, 2668 can be omitted.

The invention is not limited to the embodiments described above. The invention is not limited to any particular hash functions, or to cryptographic functions (which are easy to compute but are one-way or collision resistant). In some embodiments, it is desirable that a function f or H be collision resistant not in the sense that it is difficult to find different x and y with the same image but in the sense that if x and y are uniformly drawn from the function's domain, the probability is small that they both will have the same image:

$$P\{H(x)=H(y)\} \leq \alpha$$

where $\alpha$ is a small constant (e.g. $1/10$, or $1/100$, or $2^{-25}$, or $2^{-50}$, or $2^{-80}$, or $2^{-160}$, or some other value). Some or all of the techniques used for validity proofs can also be used for invalidity proofs and vice versa. The CA, the Sub-CAs, the directories and the systems 110 may include software-programmable or hardwired computer systems interconnected via a network or networks. Each function f or H represents an evaluation method performed by a computer system. The invention is not limited to the step sequences shown in the flowcharts, as the step order is sometimes interchangeable and further different steps may be performed in parallel. Other embodiments and variations are within the scope of the invention, as defined by the appended claims.

All of the following references are incorporated herein by reference.

[1] W. Aiello, S. Lodha, and R. Ostrovsky. Fast digital identity revocation. In *Proc. of CRYPTO '98*, 1998.

[2] G. Ateniese, J. Camenisch, M. Joye, and G. Tsudik. A Practical and Provably Secure Coalition-Resistant Group Signature Scheme. In *Proceedings of CRYPTO 2000*, 2000.

[3] M. Bellare and P. Rogaway. Random oracles are practical: A paradigm for designing efficient protocols. In *Proc. First Annual Conference on Computer and Communications Security*, ACM, 1993.

[4] D. Boneh, B. Lynn, and H. Shacham. Short signatures from the Weil pairing. In *Proceedings of Asiacrypt '01*, 2001.

[5] F. Elwailly and Z. Ramzan. QuasiModo: More Efficient Hash Tree-Based Certificate Revocation. Manuscript, 2003.

[6] I. Gassko, P. S. Gemmell, and P. MacKenzie. Efficient and fresh certification. In Proceedings of PKC 2000, 2000.

[7] S. Goldwasser, S. Micali, and R. L. Rivest. A Digital Signature Scheme Secure Against Adaptive Chosen-Message Attacks. SIAM Journal on Computing, 17(2):281-308, 1988.

[8] Y-C. Hu, A. Perrig, and D. Johnson. Efficient security mechanisms for routing protocols. In proceedings of the 10th Annual Network and Distributed System Security Symposium (NDSS), 2003.

[9] M. Jakobsson, J-P. Hubaux, and L. Buttyan. A micropayment scheme encouraging collaboration in multi-hop cellular networks. In *Proceedings of the 7th International Conference on Financial Cryptography*, 2003.

[10] M. Jakobsson, T. Leighton, S. Micali, and M. Szydlo. Fractal merkle tree representation and traversal. In *Proceedings of the Cryptographer's Track*, RSA Conference., 2003.

[11] S. Jarecki and A. Odlyzko. An efficient micropayment system based on probabilistic polling. In *Proceedings of the 1st International Conference on Financial Cryptography*, 1997.

[12] Robert Johnson, David Molnar, Dawn Xiaodong Song, and David Wagner. Homomorphic signature schemes. In CT-RSA, pages 244-262, 2002.

[13] C. Jutla and M. Yung. PayTree: Amortized signatures for flexible micropayments. In *Proceedings of the second USENIX workshop on electronic commerce*, 1996.

[14] S. Kim and H. Oh. An atomic micropayment system for a mobile computing environment. *IEICE Transactions of Information and Systems*, E84-D(6):709-716, 2001.

[15] P. Kocher. On Certificate Revocation and Validation. In *Proceedings of the 2nd International Conference on Financial Cryptography*, 1998.

[16] Satoshi Koga and Kouichi Sakurai. A distributed certificate status protocol with single public key. In *Proceedings of PKC 2004*, pages 389-401, 2004.

[17] R. J. Lipton and R. Ostrovsky. Micro-Payments via Efficient Coin Flipping. In *Proceedings of the 2nd International Conference on Financial Cryptography*, 1998.

[18] A. Malpani, R. Housely, and T. Freeman. Simple Certificate Validation Protocol—(SCVP). In *IETF Draft*—draft-iet-pkix-scvp-12.txt, June 2003.

[19] R. C. Merkle. Protocols for Public-Key Cryptography. In *IEEE Symposium on Security and Privacy*, 1980.

[20] S. Micali. Efficient Certificate Revocation. MIT/LCS/TM 542b, Massachusetts Institute of Technology, 1996.

[21] S. Micali. Efficient Certificate Revocation. In *Proceedings of the RSA Data Security Conference*, 1997. Also U.S. Pat. No. 5,666,416.

[22] S. Micali. NOVOMODO: scalable certificate validation and simplified PKI management. In *Proceedings of the 1st Annual PKI Research Workshop*, 2002.

[23] M. Myers, R. Ankney, A. Malpani, S. Galperin, and C. Adams. X.509 internet public key infrastructure Online Certificate Status Protocol—OCSP. In *Internet RFC 2560*, June 1999.

[24] M. Naor and K. Nissim. Certificate Revocation and Certificate Update. In *Proceedings of USENIX Security*, 1998.

[25] National Bureau of Standards. NBS FIPS PUB 81: DES modes of operation. 1980.

[26] National Institute of Standards. FIPS 180-1: Secure hash standard. 1995.

[27] M. Pierce and D. O'Mahony. Micropayments for Mobile Networks. In *Proceedings of European Wireless*, 1999. Winner of Best Paper Award.

[28] R. L. Rivest. The MD5 message digest algorithm. In *Internet RFC 1321*, April 1992.

[29] R. L. Rivest. Electronic Lottery Tickets as Micropayments. In *Proceedings of the 2nd International Conference on Financial Cryptography*, 1997.

[30] R. L. Rivest and A. Shamir. PayWord and MicroMint—Two Simple Micropayment Schemes. *CryptoBytes (RSA Laboratories)*, 2(1), 1996. Proceedings of 1996 International Workshop on Security Protocols.

[31] R. L. Rivest, A. Shamir, and L. Adleman. A Method for Obtaining Digital Signatures and Public-Key Cryptosystems. *Communications of the ACM*, 21:120-126, 1978.

[32] Ron Steinfeld, Laurence Bull, and Yuliang Zheng. Content extraction signatures. In *Proceedings of the 4th International Conference Seoul on Information Security and Cryptology*, pages 285-304. Springer-Verlag, 2002.

[33] H. Tewari and D. O'Mahony. Multiparty Micropayments for Ad-Hoc Networks. In *Proceedings of the IEEE Wireless Communications and Networking Conference (WCNC)*, 2003.

[34] H. Tewari and D. O'Mahony. Real-Time Payments for Mobile IP. *IEEE Communications*, 41(2):126-136, 2003.

[35] D. Wheeler. Transactions Using Bets. In *Proceedings of Fourth Cambridge Workshop on Security Protocols*, 1996.

[36] J. Zhou and K-Y. Lam. Undeniable Billing in Mobile Communication. In *Proceedings of MOBICOM*, 1998.

The invention claimed is:

1. A computer implemented method for generating a system of sets $\{F\}$, each set F being a set of one or more digital certificates DC and/or digital certificate slots assignable to digital certificates, each digital certificate $DC=DC(CK, EN)$ certifying that a corresponding cryptographic key CK is associated with an entity EN associated with a computer system, wherein the system of sets $\{F\}$ is generated taking into account one or more groups of said computer systems, each group being a multicasting group or a possible multicasting group, the method comprising:

(1) for at least one said multicasting group, generating, using a computer operation, a set $F\epsilon\{F\}$ comprising at least two digital certificates DC(CK, EN) whose associated entities EN have their associated computer systems belonging to said at least one multicasting group;

(2) generating, using a computer operation, data defining a validity proof for the set F.

2. The method of claim 1 wherein the set F includes all of the digital certificates whose associated entities EN have their associated computer systems belonging to said at least one multicasting group.

3. A computer system adapted to perform the method of claim 2.

4. A non-transitory data carrier comprising one or more computer instructions operable to cause a computer system to perform the method of claim 2.

5. The method of claim 1 wherein the set F consists of all of the digital certificates whose associated entities EN have their associated computer systems belonging to said at least one multicasting group.

6. A computer system adapted to perform the method of claim 5.

7. A non-transitory data carrier comprising one or more computer instructions operable to cause a computer system to perform the method of claim 5.

8. A computer system adapted to perform the method of claim 1.

9. A non-transitory data carrier comprising one or more computer instructions operable to cause a computer system to perform the method of claim 1.

10. The non-transitory data carrier of claim 9, wherein the method further comprises transmitting, over a network, a validity status proof for at least one set F.

11. A computer implemented method for selecting a complement cover $CC_R$ for a set R of revoked digital certificates, each digital certificate certifying that a cryptographic key is associated with an entity associated with a computer system, the method comprising:

selecting, using a computer operation, sets F of valid digital certificates for the complement cover $CC_R$ taking into account priorities of the sets F, wherein the priority of a set F is increased if the set F comprises two or more digital certificates whose entities have their computer systems belonging to a single multicasting group.

12. A computer system adapted to perform the method of claim 11.

13. A non-transitory data carrier comprising one or more computer instructions operable to cause a computer system to perform the method of claim 11.

14. The non-transitory data carrier of claim 13, wherein the method further comprises transmitting, over a network, a validity status proof for at least one selected set F.

15. A method for forming multicasting groups of computer systems in a network, each computer system being associated with at least one digital certificate certifying that a cryptographic key is associated with an entity associated with a computer system, wherein a validity or invalidity proof is defined for each of a plurality of sets of the digital certificates, wherein each of said sets comprises a plurality of digital certificates, each set being associated with a priority, the method comprising:

(1) selecting one or more sets based on their priorities; and
(2) for each set,
- (2a) forming a multicasting group comprising computer systems associated with the set's digital certificates, and/or
- (2b) for a computer system associated with at least one of the set's digital certificates, the computer system joining a multicasting group corresponding to the set.

16. The method of claim 15 wherein each set's priority is proportional to the sum of remaining unexpired periods of one or more of the set's certificates.

17. A computer system adapted to perform the method of claim 16.

18. The method of claim 15 wherein each set's priority is proportional to the number of the set's certificates.

19. A non-transitory data carrier comprising computer data comprising one or more computer instructions operable to cause a computer system to perform the method of claim 18.

20. A computer system adapted to perform the method of claim 15.

21. A non-transitory data carrier comprising one or more computer instructions operable to cause a computer system to perform the method of claim 15.

22. The non-transitory data carrier of claim 21, wherein the method further comprises transmitting, over a network, a validity status proof for at least one selected set.

23. A computer implemented method for verifying a validity or invalidity of a first digital certificate certifying that a cryptographic key is associated with an entity, wherein the first digital certificate belongs to each set in a first plurality of sets, the method comprising:

(a) receiving, over a network:
- (a1) period data for a period of time pi, for computing a first target in computer-implemented computation, wherein the period of time is one of a plurality of periods of time each of which is associated with period data, and the first target is computable, in computer-implemented computation, from the period data associated with any one of the periods of time;
wherein the first digital certificate belongs to each set in the first plurality of sets, and for each set in at least the first plurality, the period data form at least part of a hash tree, each period of time corresponding to the hash tree's node comprising the period data for the period of time, different periods of time corresponding to different nodes, wherein for at least two of the periods of time, one of the corresponding nodes is neither a child nor a parent of the other one of the corresponding nodes;
- (a2) first target computation data comprising values of one or more of the nodes for computing, in computer-implemented computation, the first target recited in (a1) from the period data received in (a1) without using period data for any period of time later than pi;
- (a3) second target computation data for computing, in computer-implemented computation, a second target from the first target, wherein the second target is a function of a plurality of first targets each of which is associated with a set comprising the first digital certificate;

(b) computing, in computer-implemented computation, the first target recited in (a1) from the period data and the first target computation data without using period data for any period of time later than pi;
(c) computing, in computer-implemented computation, the second target from the first target computed in (b) and from the second target computation data;
(d) matching the second target against a value obtained from the first digital certificate to determine the first digital certificate's validity or invalidity.

24. A non-transitory computer-readable computer storage medium comprising one or more computer instructions operable to cause a computer system to perform the method of claim 23.

25. A computer system adapted to perform the method of claim 23.

26. The method of claim 23, wherein for at least one set in the first plurality, for the nodes corresponding to at least two of the periods of time, one of the nodes is a parent of the other one of the nodes in the corresponding hash tree.

27. A non-transitory computer-readable computer storage medium comprising computer data comprising a validity or invalidity proof for a first digital certificate certifying that a cryptographic key is associated with an entity, wherein the first digital certificate belongs to each set in a first plurality of sets, the computer data comprising:

(a1) period data for a period of time pi, for computing a first target, wherein the period of time is one of a plurality of periods of time each of which is associated with period data, and the first target is computable, in computer-implemented computation, from the period data associated with any one of the periods of time;
wherein the first digital certificate belongs to each set in the first plurality of sets, and for each set in at least the first plurality, the period data form at least part of a hash tree, each period of time corresponding to the hash tree's node comprising the period data for the period of time, different periods of time corresponding to different nodes, wherein for at least two of the periods of time, one of the corresponding nodes is neither a child nor a parent of the other one of the corresponding nodes;
(a2) first target computation data comprising values of one or more of the nodes for computing, in computer-implemented computation, the first target recited in (a1) from the period data received in (a1) without using period data for any period of time later than pi;
(a3) second target computation data for computing, in computer-implemented computation, a second target from the first target, wherein the second target is a function of a plurality of first targets each of which is associated with a set comprising the first digital certificate.

28. The non-transitory computer storage medium of claim 27, wherein for at least one set in the first plurality, for the nodes corresponding to at least two of the periods of time, one of the nodes is a parent of the other one of the nodes in the corresponding hash tree.

* * * * *